United States Patent (10) Patent No.: US 9,282,541 B2
Park et al. (45) Date of Patent: Mar. 8, 2016

(54) METHOD IN WHICH A TERMINAL COOPERATES WITH ANOTHER TERMINAL TO TRANSMIT DATA, AND METHOD FOR RECEIVING THE DATA

(75) Inventors: Sungho Park, Anyang-si (KR); Sunam Kim, Anyang-si (KR); Bin Chul Ihm, Anyang-si (KR); Jinyoung Chun, Anyang-si (KR); Jiwon Kang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 526 days.

(21) Appl. No.: 13/640,463

(22) PCT Filed: Apr. 14, 2011

(86) PCT No.: PCT/KR2011/002672
§ 371 (c)(1),
(2), (4) Date: Oct. 10, 2012

(87) PCT Pub. No.: WO2011/129634
PCT Pub. Date: Oct. 20, 2011

(65) Prior Publication Data
US 2013/0029680 A1 Jan. 31, 2013

Related U.S. Application Data

(60) Provisional application No. 61/323,880, filed on Apr. 14, 2010, provisional application No. 61/333,236, filed on May 10, 2010.

(51) Int. Cl.
*H04W 72/04* (2009.01)
*H04B 7/02* (2006.01)
*H04W 92/18* (2009.01)
*H04W 88/04* (2009.01)

(52) U.S. Cl.
CPC ......... *H04W 72/0406* (2013.01); *H04B 7/026* (2013.01); *H04W 72/042* (2013.01); *H04W 72/0413* (2013.01); *H04W 88/04* (2013.01); *H04W 92/18* (2013.01)

(58) Field of Classification Search
CPC ... H04W 4/008; H04W 76/023; H04W 8/005; H04W 76/02; H04W 84/20; H04W 84/12; H04W 88/06; H04W 76/043
USPC .............................. 455/11.1, 41.1, 41.2, 450
See application file for complete search history.

(56) References Cited

FOREIGN PATENT DOCUMENTS

KR 10-2008-0101269 11/2008
KR 10-2009-0092429 9/2009
KR 10-2009-0117244 11/2009

*Primary Examiner* — Lester Kincaid
*Assistant Examiner* — Dung Lam
(74) *Attorney, Agent, or Firm* — Dentons US LLP

(57) ABSTRACT

According to the disclosure of the present description, a method in which a terminal cooperates with another terminal to transmit data to a base station is provided. The method comprises the following steps: if data to be transmitted to a base station exists, mutually exchanging data with another cooperative terminal which belongs to the same cooperative cluster; transmitting, to the base station, a request message for an allocation of an uplink resource for transmitting the data; receiving, from the base station, a permission message for the uplink resource; and, upon receipt of the permission message, transmitting the data and data of said other terminal using the uplink resource in accordance with the permission message.

4 Claims, 12 Drawing Sheets

FIG.1
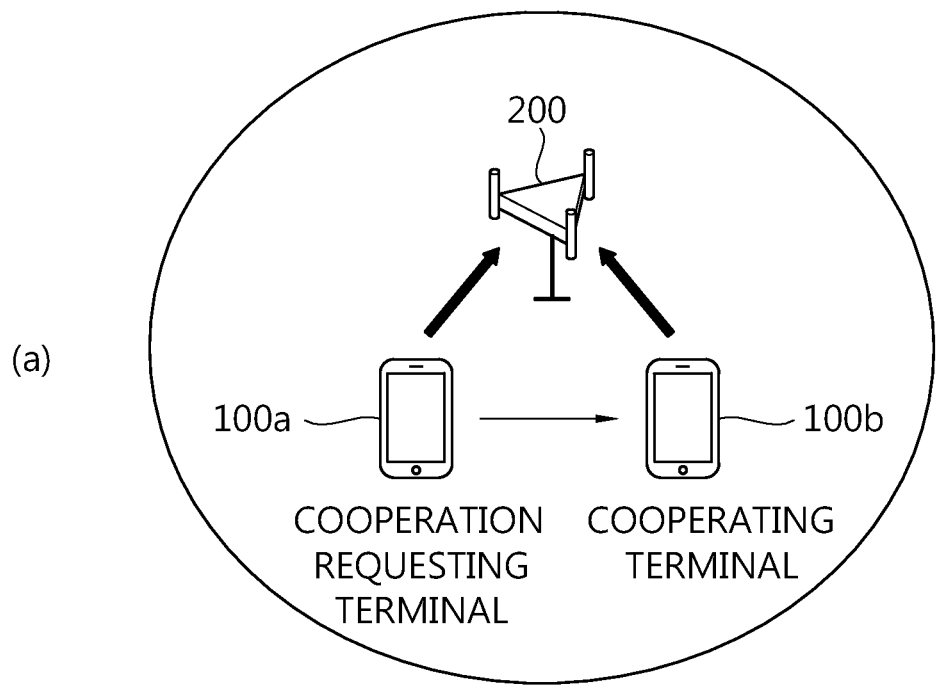
(a)
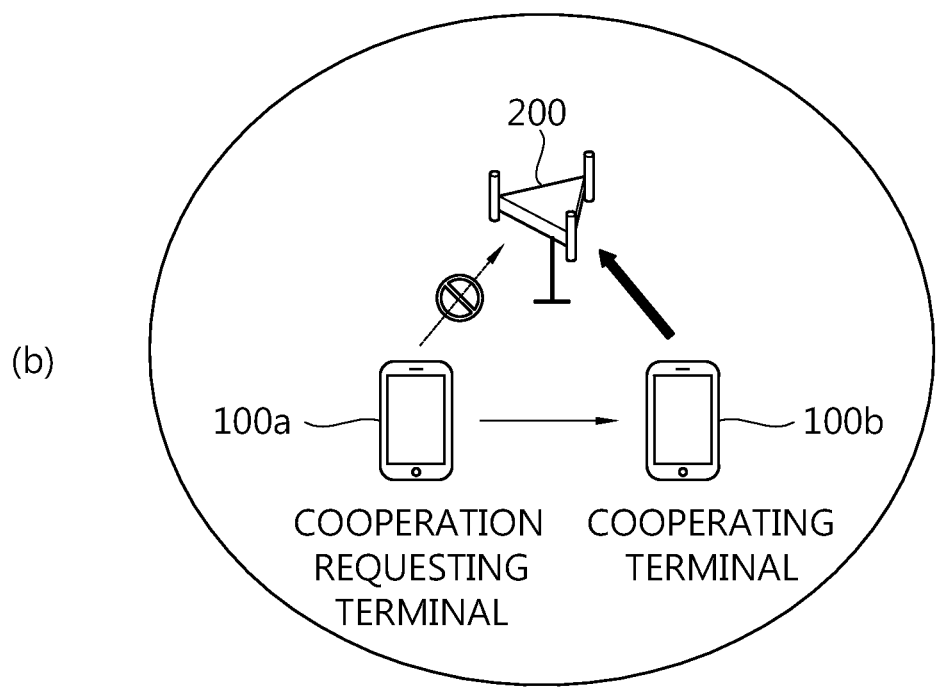
(b)

FIG.2
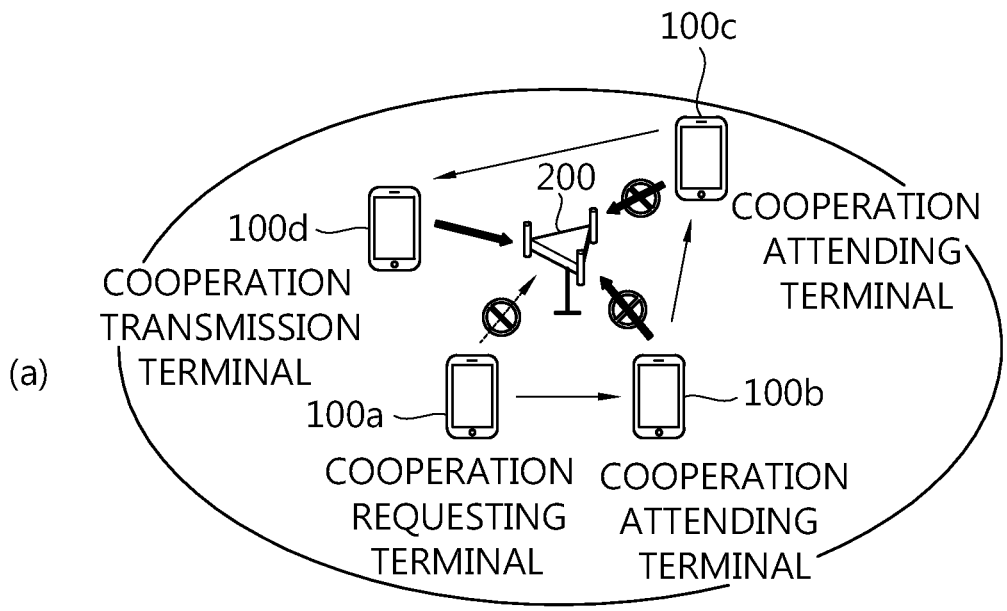
(a)
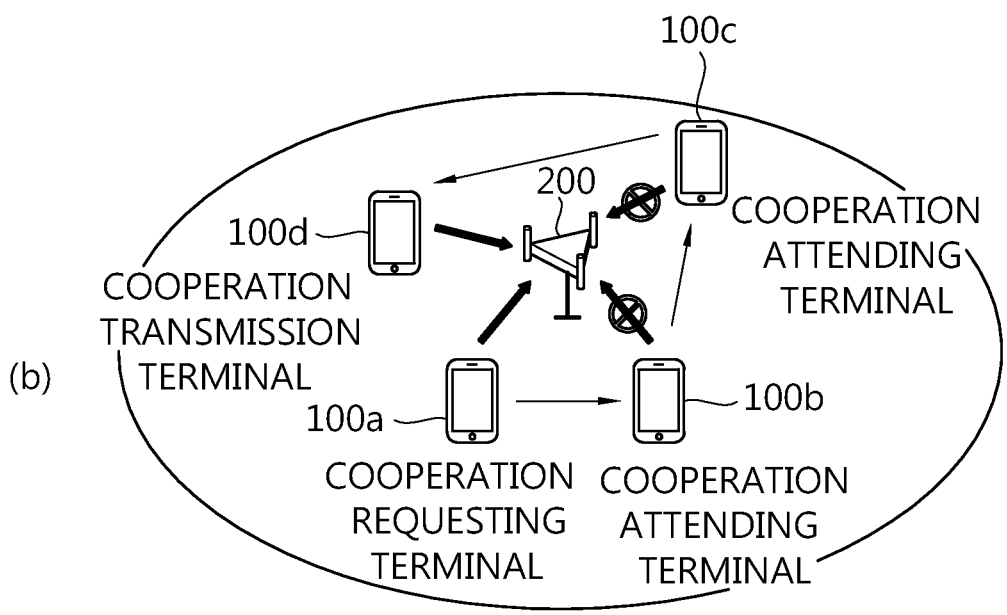
(b)

FIG.3
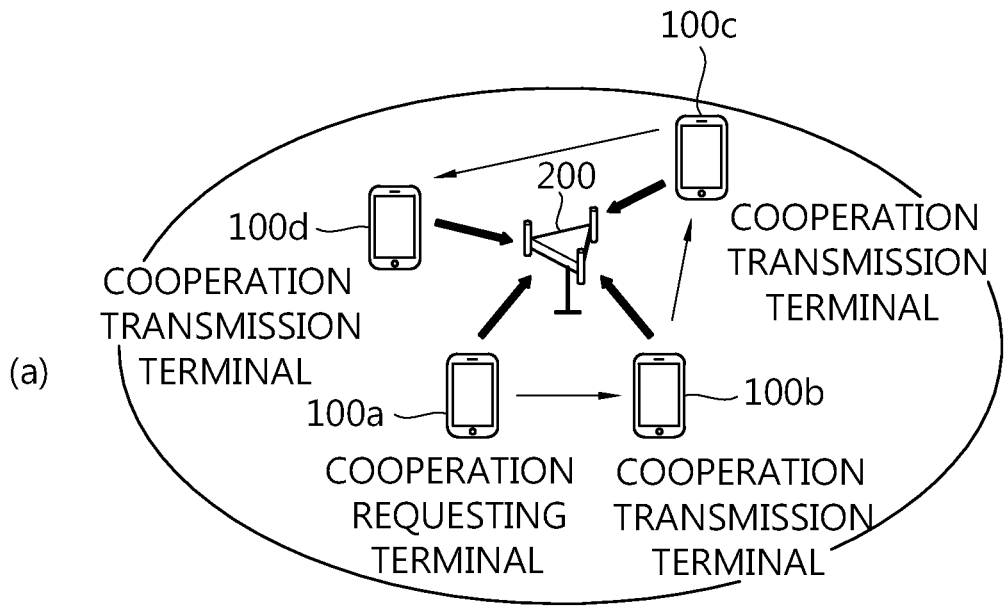
(a)
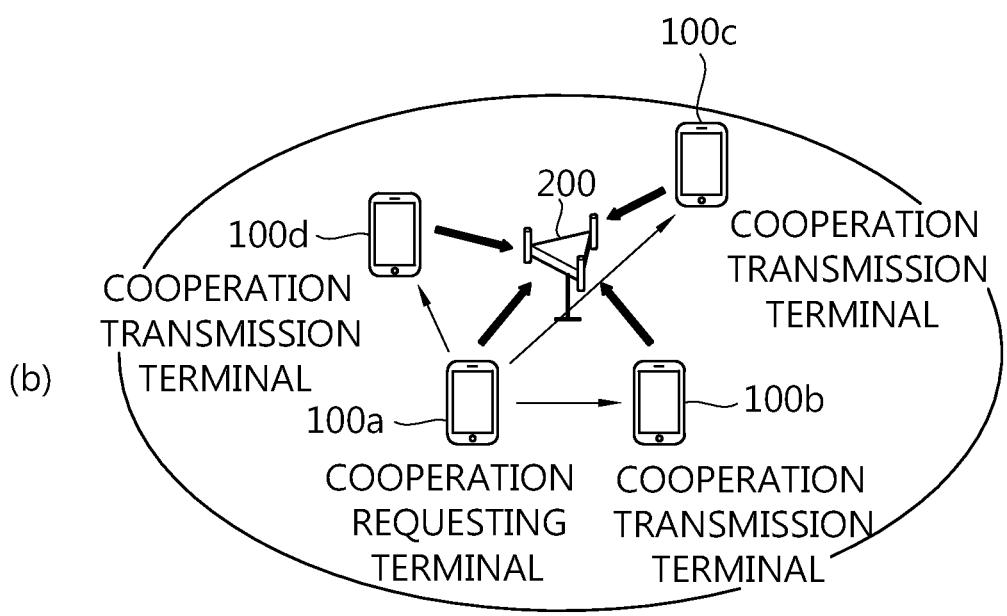
(b)

FIG.4
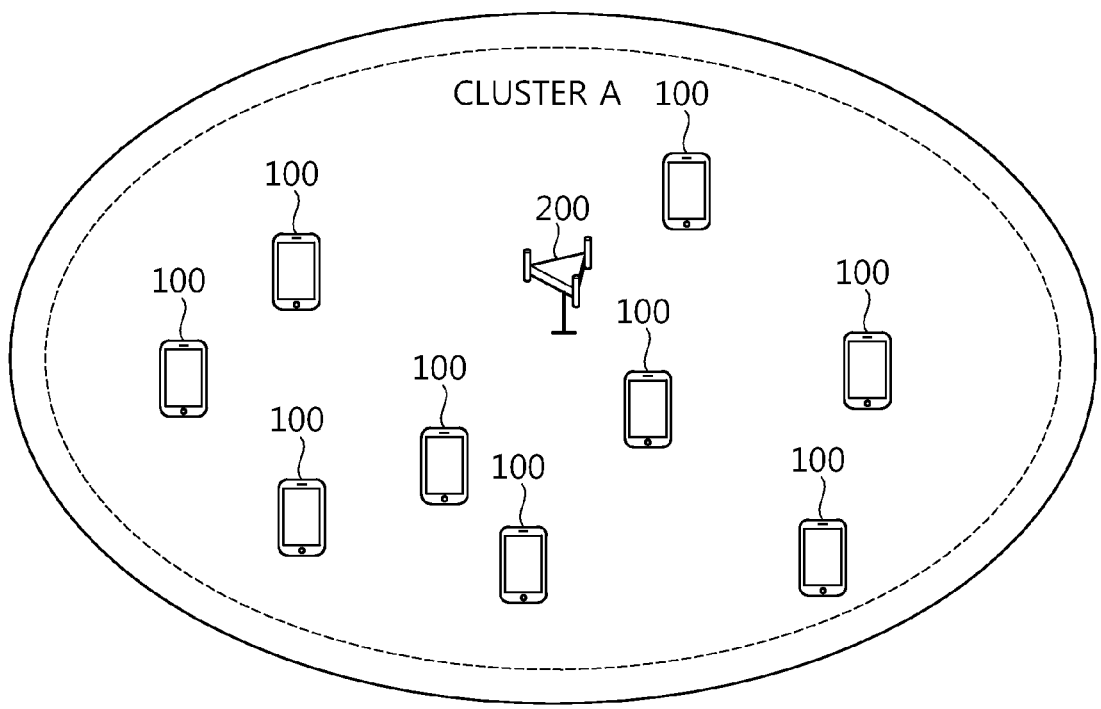
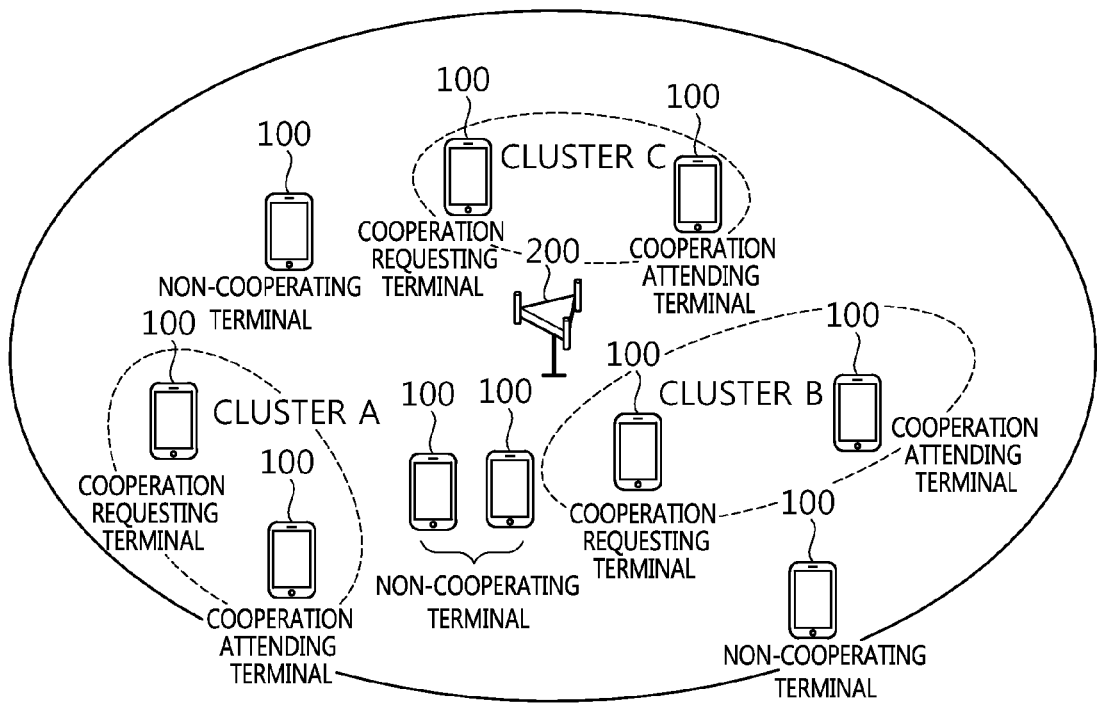

FIG.5
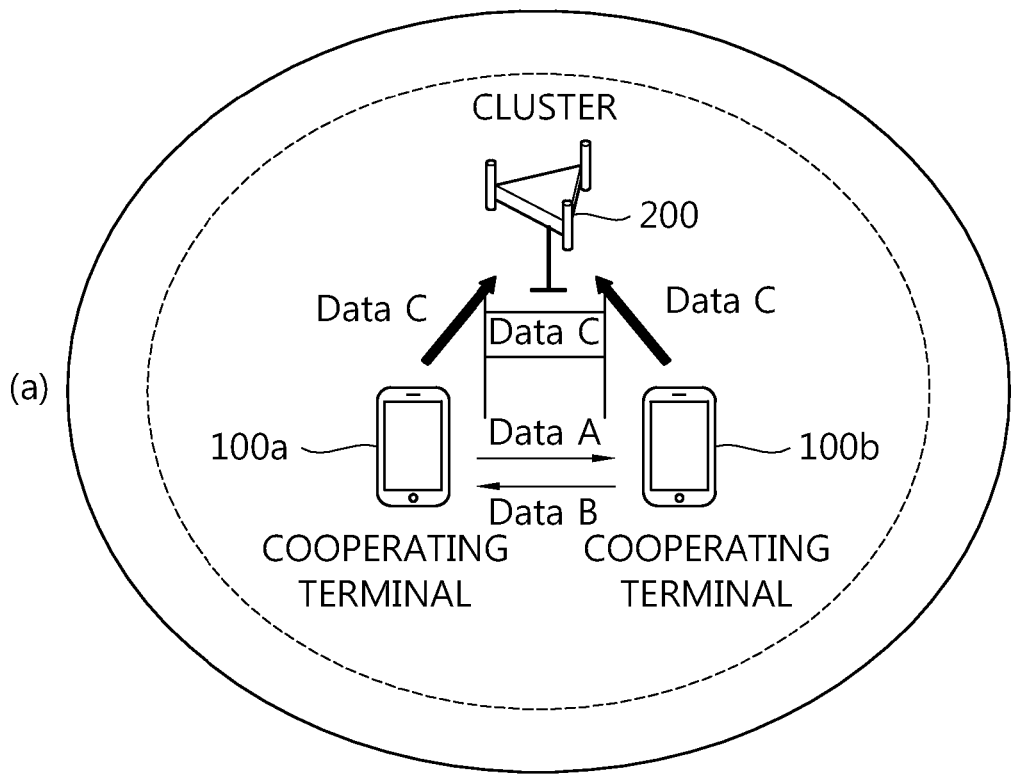
(a)
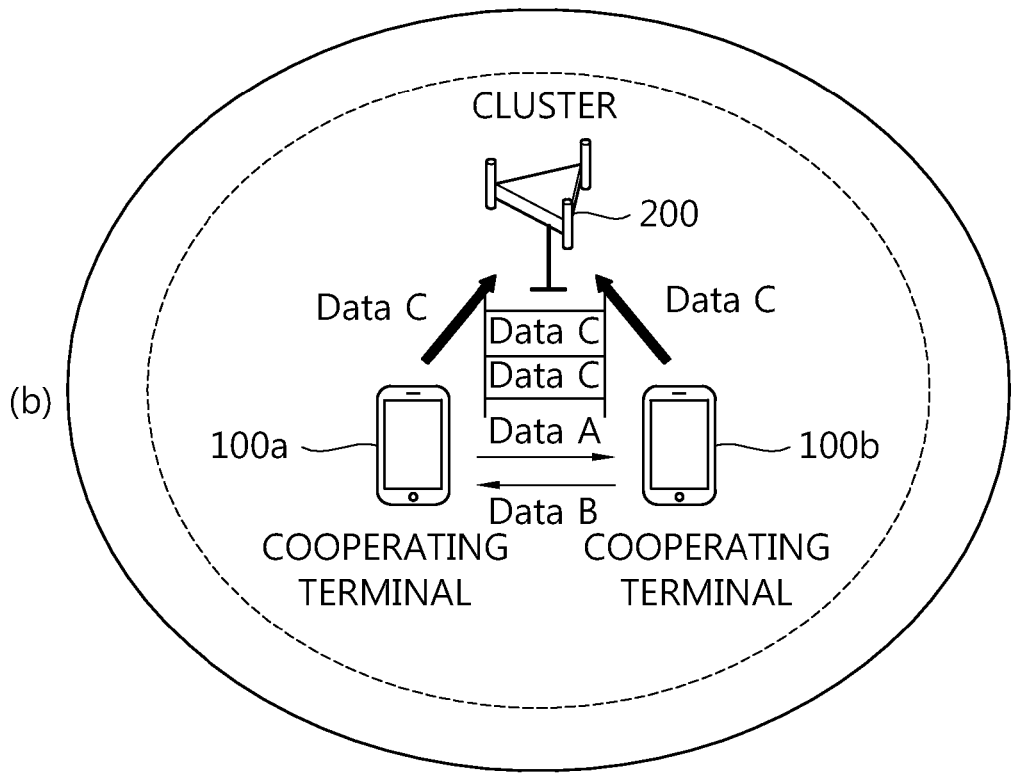
(b)

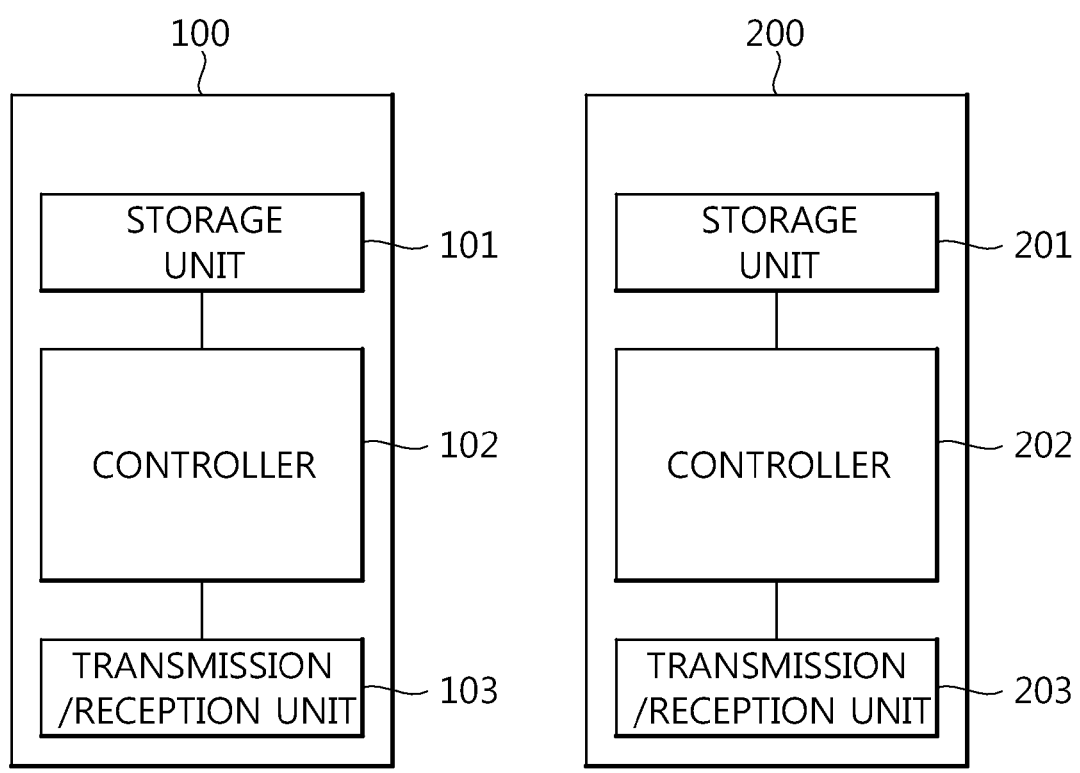

METHOD IN WHICH A TERMINAL COOPERATES WITH ANOTHER TERMINAL TO TRANSMIT DATA, AND METHOD FOR RECEIVING THE DATA

TECHNICAL FIELD

The present invention relates to cooperative communication.

BACKGROUND ART

MIMO stands for Multi-Input Multi-Output. MIMO is a scheme that adopts a multi-transmission antenna and a multi-reception antenna rather than using a single transmission antenna and a single reception antenna, thereby enhancing data transmission/reception efficiency. That is, this is a technology to increase capacity or enhance performance by using a multi-antenna at a transmission end or reception end in the wireless communication system. MIMO is herein referred to as "multi-antenna".

In sum, the multi-antenna technology is an application of a technology that, in receiving an overall message, gathers data pieces received from a number of antennas to thereby complete the whole data rather than depending on a single antenna. MIMO may enhance data transmission speed in a specific range or may increase a system range with a specific data transmission speed, and thus, draws attention as a next-generation technology that may overcome a limitation on the amount of transmission in mobile communication due to expansion of data communication, as well as that may be widely used in mobile terminals and relays.

In general, if another version or replica of a transmission signal is not additionally transmitted when the transmission channel is in the situation of deep fading, the transmitter is troubled in determining the transmitted signal. The source corresponding to the other version or replica signal which has been just mentioned is referred to as diversity, which is one of the most critical factors that contribute to reliable transmission over the wireless channel.

Use of diversity may maximize transmission reliability or data transmission capacity. The system that performs diversity by using a multi-transmission antenna and a multi-reception antenna is referred to as "MIMO (Multi Input Multi Output) system" or "multi-antenna system".

As such, there have been lots of research efforts on spatial diversity schemes using a multi-transmission/reception antenna (MIMO) system to overcome performance deterioration due to channel padding of wireless communication.

The multi-transmission/reception antenna system implements two or more antennas in the transmitter and receiver to thereby provide advantages, such as high data transmission rate, low error rate, and increase in channel capacity.

However, despite such advantages of the multi-transmission/reception antenna, limitations on size, weight, and hardware complexity, generally cause it impossible to implement a multi-transmission/reception antenna system for uplink.

As an alternative to this, the cooperative diversity scheme has been suggested, which aims to allow each terminal in a wireless communication network to obtain advantages, such as spatial diversity gain of a multi-transmission/reception antenna system, decreased error rate, and increased channel capacity, even with at least one or more antennas alone. For this, the cooperative diversity scheme forms a virtual multi-transmission/reception antenna (virtual MIMO) system by allowing nearby terminals to share resources, such as antennas or frequency bandwidths, of relays or relays with femto-cells, so that such advantages of the multi-transmission/reception antenna system may be also achieved by terminals having at least one or more antennas.

As such, the cooperative diversity scheme is based on using a separate relay.

However, there is a need for a method of allowing for cooperative transmission using terminals without a separate relay.

DISCLOSURE

Technical Problem

Accordingly, an object of this disclosure is to provide a method of enabling cooperative transmission using terminals. Specifically, this disclosure aims to provide a method of allowing a plurality of terminals to establish a cooperative transmission relationship between each other. Further, another object of this disclosure is to provide a method of searching for a terminal requesting cooperative transmission and another terminal that may respond to the request.

Still another object of this disclosure is to provide a method of efficiently assigning resources depending on each transmission type when cooperative transmission is performed.

Technical Solution

To achieve the above objects, according to an aspect of the present invention, there is provided a method of receiving data cooperatively transmitted by terminals by a base station. The method may include the steps receiving a message for an uplink resource allocation request from one or more of a first terminal and a second terminal, transmitting a permission message for an uplink resource to the one or more terminals that have transmitted the message in a case where the first terminal and the second terminal are in a cooperative relationship to transmit data of at least the first terminal, wherein the first terminal and the second terminal belong to the same cooperative cluster, wherein the permission message includes one or more of information on the assigned uplink resource, an identifier of each of the terminals, an identifier of the first terminal which is a main entity of the cooperation, and information on the cooperative cluster, and wherein the identifiers are unique identifiers or temporary identifiers, and receiving data including the data of the first terminal using the uplink resource from at least the second terminal among the terminals.

The information on the assigned uplink resource in the permission message may include one or more of information on an uplink resource assigned to the first terminal and information on an uplink resource assigned to the second terminal.

The uplink resource assigned to the first terminal and the uplink resource assigned to the second terminal may be the same as each other.

The uplink resource assigned to the first terminal and the uplink resource assigned to the second terminal may be different from each other.

The permission message may include information on the cooperative cluster and information on terminals which are in a cooperative relationship to transmit the data of the first terminal among a plurality of terminals belonging to the cooperative cluster.

The received data may further include data of the second terminal.

The received data may include data in which the data of the first terminal and the data of the second terminal are subjected to concatenation or permutation.

The message for the resource allocation request may include one or more of the information on the cooperative cluster and a message or information for requesting cooperation with the second terminal.

The information for the cooperation request may include one or more of identification information of a cooperation requesting terminal, information on the cooperative cluster, resource request information necessary for data sharing between the terminals, and resource allocation information necessary for data sharing between the terminals.

The method may further include the step of determining that the first terminal and the second terminal are in the cooperation relationship based on the cooperative cluster and the uplink resource allocation request message.

To achieve the above objects, according to another aspect of the present invention, there is provided a method of transmitting data to a base station by a terminal cooperating with another terminal. The method may include, in a case where there is data to be transmitted to the base station, exchanging data with another cooperable terminal belonging to the same cooperative cluster, transmitting a message for requesting uplink resource allocation to the base station so as to transmit the data, receiving a permission message for the uplink resource from the base station, and when receiving the permission message, transmitting the data and data of the other terminal using an uplink resource based on the permission message.

The permission message may include information on the uplink resource, and the information on the uplink resource may include one or more of information on the uplink resource assigned to the terminal, and information on the uplink resource assigned to the other terminal.

The permission message may include information on the cooperative cluster and information on other terminals that are in a cooperation relationship for data transmission of the terminal among a plurality of terminals belonging to the cooperative cluster.

The message for the resource allocation request may include one or more of information on the cooperative cluster and a message or information for requesting cooperation with the other terminal.

Advantageous Effects

According to the present invention, when a terminal is not in a good channel condition or is not assigned with resources enough to transmit data, the terminal may perform cooperative transmission with another terminal, thereby increasing a chance of successful data transmission.

DESCRIPTION OF DRAWINGS

FIG. 1 illustrates a concept of cooperative transmission.

FIG. 2 illustrates another concept of cooperative transmission.

FIG. 3 illustrates still another concept of cooperative transmission.

FIG. 4 illustrates a concept of a cooperative cluster of terminals.

FIG. 5 illustrates examples of resource allocation by a base station for cooperative transmission.

FIG. 12 is a block diagram illustrating configurations of a terminal 100 and a base station 200 according to the present invention.

BEST MODE

Figure 6:
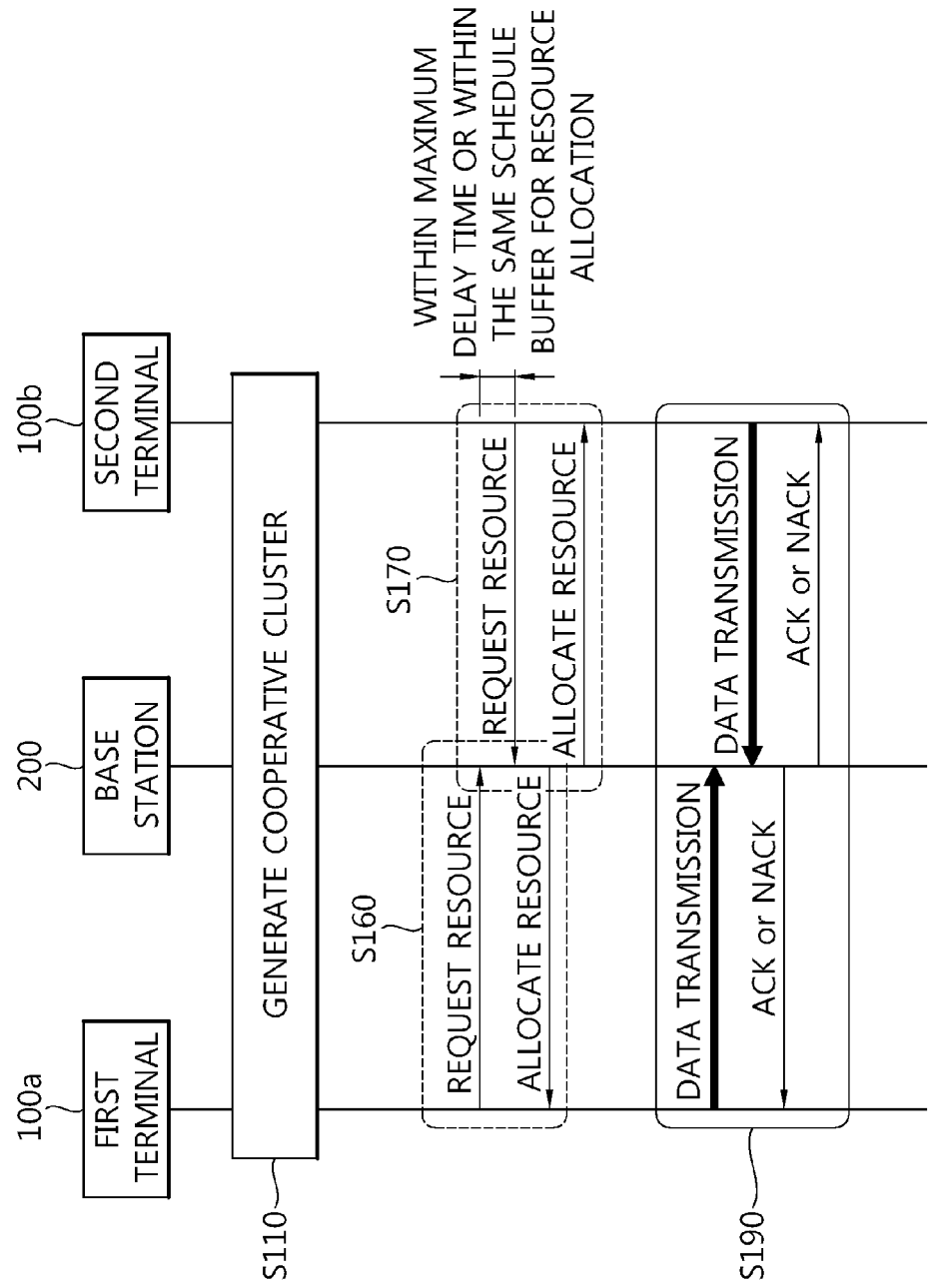
FIG. 6 illustrates an exemplary cooperative transmission method between terminals according to an embodiment.

The present invention applies to cooperative diversity. However, the present invention is not limited thereto, and may also apply to all the communication systems and methods or other systems to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

Hereinafter, although terminals are shown in the drawings, the terminals may be also referred to as UE (User Equipment), ME (Mobile Equipment), MSs (Mobile Stations), UTs (User Terminals), SSs (Subscriber Stations), wireless devices, handheld devices, or ATs (Access Terminals). Further, the terminals may be portable devices having communication functions, such as mobile phones, PDAs, smartphones, wireless models, or laptop computers, or stationary devices, such as PCs or car-mounted devices.

FIG. 1 illustrates a concept of cooperative transmission.

Referring to FIG. 1, a base station 200 and terminals are provided. At this time, for example, for the reason that channel state is not good or enough resources are not assigned, the terminal 100a requests that another terminal 100b cooperates with the terminal 100a, and in response to the request, the terminal 100b may transmit data of the terminal 100a to the base station 200.

At this time, as shown in FIG. 1, the terminal requesting the cooperation is referred to as a cooperation requesting terminal, and the terminal responding to the request is referred to as a cooperating terminal.

The cooperation requesting terminal may be also referred to as a cooperation main terminal. The cooperating terminal may be also referred to as a cooperation transmission terminal or a cooperated terminal.

Further, the number of cooperating terminals 100b that transmit data of the terminal 100a in response to the cooperation is 1 as shown in FIG. 1. As such, if the number of cooperating terminals 100b is limited to 1, processing delay decreases and implementation is relatively easy. However, because the number of terminals is small, a combining gain that may be obtained may decrease and the state (or quality) of a link or channel between another cooperating terminal 100b and the base station 200 may be deteriorated, so that success rate in transmission may be relatively lowered.

In FIG. 1(a), the cooperation requesting terminal 100a transmits its own data to another terminal 100b and also transmits the data to the base station 200. Further, if the terminal 100b transmits the data to the base station 200, the base station may additionally obtain a combining gain.

On the contrary, in FIG. 1(b), when the cooperation requesting terminal 100a transmits its data to the terminal 100b, the data is not transmitted to the base station 200.

FIG. 2 illustrates another concept of cooperative transmission.

Referring to FIG. 2, a base station 200 and a plurality of terminals 100a, 100b, 100c, and 100d are provided. At this time, for example, for the reason that the channel state is not good or enough resources are not assigned, the terminal 100a sends a request of cooperation to another terminal 100b, the terminal 100b sends a request of cooperation to still another terminal 100c, and the terminal 100c sends a request of cooperation to yet still another terminal 100d.

As such, only one of the plurality of terminals 100b, 100c, and 100d may transmit the data of the terminal 100a to the base station 200 in response to the cooperation request.

At this time, as shown in FIG. 2, the terminal requesting the cooperation is referred to as cooperation requesting terminal, and the terminals 100b, 100c, and 100d attending the cooperation are referred to as cooperation attending terminals, and the terminal attending the cooperation to actually transmit data is referred to as cooperation transmission terminal 100d.

The cooperation requesting terminal may also be referred to as cooperation main terminal. The cooperation transmission terminal may be also referred to as cooperating terminal or cooperated terminal.

Meanwhile, in FIG. 2(a), among the plurality of cooperation attending terminals 100b, 100c, and 100d that respond to the cooperation, the number of terminals actually transmitting the data of the terminal 100a to the base station 200 is 1. At this time, the cooperation requesting terminal 100a does not transmit its data to the base station 200.

As such, the method of allowing only one terminal among the plurality of cooperation attending terminals 100b, 100c, and 100d responding to the cooperation to transmit data of the cooperation requesting terminal 100a to the base station 200 allows for selection of the terminal which provides the best link or channel quality together with the base station 200 and enables data to be transmitted through the selected terminal, thereby ensuring successful transmission. However, since the data should sequentially get through the plurality of cooperation attending terminals 100b, 100c, and 100d, delay may occur. Further, since the number of terminals actually transmitting the data of the terminal 100a to the base station 200 is one, the combining gain that may be additionally obtained may decrease.

Meanwhile, in FIG. 2(b), the cooperation requesting terminal 100a transmits its data to the base station 200, and the cooperation transmission terminal 100d also transmits the data of the cooperation requesting terminal 100a to the base station 200.

FIG. 3 illustrates still another concept of cooperative transmission.

Referring to FIG. 3(a), a base station 200 and a plurality of terminals 100a, 100b, 100c, and 100d are provided. At this time, for example, for the reason that channel state is not good or enough resources are not assigned, the terminal 100a may send a request of cooperation to another terminal 100b, the terminal 100b may send a request of cooperation to still another terminal 100c, and the terminal 100c may send a request of cooperation to yet still another terminal 100d.

As such, in response to the cooperation request, among the plurality of terminals 100b, 100c, and 100d, one or more terminals may transmit data of the terminal 100a to the base station 200.

At this time, in FIG. 3(a), the plurality of terminals 100b, 100c, and 100d all transmit the data of the terminal 100a to the base station 200 in response to the request. Accordingly, in FIG. 3(a), the plurality of terminals 100b, 100c, and 100d are referred to as 'cooperation transmission terminals'.

Meanwhile, as can be seen by referring to FIG. 3(b), for example, for the reason that channel state is not good or enough resources are not assigned, the cooperation requesting terminal 100a may send a request to each of other terminals 100b, 100c, and 100d.

As such, among the plurality of terminals 100b, 100c, and 100d, a plurality of terminals may transmit the data of the terminal 100a to the base station 200 in response to the cooperation request.

As such, the method of allowing the plurality of terminals to transmit the data of the terminal 100a to the base station provides the advantage that the rate of successful transmission may sharply increase, but is difficult to implement and may cause delay in cooperative transmission.

As described above in connection with FIGS. 1 to 3, according to each cooperative transmission method, the one that receives control information regarding cooperative transmission and the content of the uplink resource allocation message between the terminal and base station vary. At this time, the resource allocation request and resource allocation need to be considered separately for each of a link between the terminal and base station and a link between the terminals. That is, the uplink resource allocation request send from the terminal to the base station and the resource allocation request send from a terminal to another terminal may be considered separately from each other. Even in case of resource allocation, the uplink resource allocation transmitted from the base station to the terminal and the resource allocation sent from a terminal to another terminal may be likewise considered separately from each other.

FIG. 4 illustrates a concept of a cooperative cluster of terminals.

Terminals may be divided into non-cooperating terminals, cooperable terminals, cooperation attending terminals, cooperative transmission terminals, and cooperation requesting terminals according to the operation and responsibility. The non-cooperating terminals may be also referred to as single transmission terminals. Further, the cooperable terminals may be also referred to as cooperating terminal candidates. The cooperation requesting terminals may also be referred to as cooperation main terminals. The cooperative transmission terminals may be also referred to as cooperating terminals or cooperated terminals.

As described above, the cooperation attending terminals refer to terminals that attend cooperative transmission but do not transmit data to the base station. At this time, terminals accepting the cooperation request may be referred to as cooperation accepting terminals. The cooperation accepting terminals include the cooperative transmission terminals (or cooperating terminals) or cooperation attending terminals.

The cooperable terminals, as shown in FIG. 4, may be grouped into a virtual group referred to as a cooperative cluster.

Specifically, the cooperative cluster may include all the terminals with which cooperation may be performed as shown in FIG. 4(a), or may include terminals with which cooperation may be performed based on geographical information (geometry) as shown in FIG. 4(b).

If the terminal enters into the base station (so-called network entry), the cooperative cluster may be generated by the base station or may be also generated when a cooperation relationship is directly established between terminals.

If the base station generates the cooperative cluster, information regarding the cooperative cluster may be periodically broadcast by the base station. Or, in response to a request from the terminal, the information regarding the cooperative cluster may be unicast.

If the terminals form the cooperative cluster on their own, information regarding the cooperative cluster may be unicast or multi-cast by the terminals or any terminal.

Meanwhile, in FIG. 4, the cooperative cluster is generated only for the terminals belonging to one base station cell with respect to cooperative transmission. However, the cooperative cluster may be also generated for terminals belonging to different base stations. As such, a plurality of base stations that enable formation of the cooperative cluster may be referred to as cooperative base stations (BSs) or cooperative (e)NodeB.

FIG. 5 illustrates examples of resource allocation by a base station for cooperative transmission.

Referring to FIG. 5, terminals 100a and 100b may negotiate mutual cooperation and may share data between each other. And, to transmit data to the base station 200, each terminal is assigned with an uplink resource. At this time, each of the terminals 100a and 100b may be assigned with uplink resources to transmit data generated by synthesizing data of its counterpart terminal. Or, each terminal may send a request of separate uplink resource allocation for data transmission of its counterpart terminal. Alternatively, each terminal may be assigned with the uplink resource to transmit its own data and may combine its own data with the counterpart terminal's data and then may transmit the resultant data. Further, only some terminal of the terminals may send a request of uplink allocation with its terminal ID (for example, the situation that one or more terminals send the same UL grant request, resource allocation request message), another terminal may transmit data of the counterpart terminal by using the assigned uplink resource. Or, the terminal may send a request of uplink resource by using its counterpart terminal's terminal ID or cluster ID.

FIG. 5(a) illustrates assigning the same resource to two terminals 100a and 100b that cooperate with the base station 200. FIG. 5(b) illustrates assigning different resources to the two terminals 100a and 100b that cooperate with the base station 200. In case of assigning the same resource, to avoid interference, orthogonal codes may be used for the two terminals. Or, in case that different resources are assigned, the different resources may be channels orthogonal to each other.

First, the scheme of using the orthogonal codes does not have an unnecessary decrease in spectral efficiency because orthogonality is guaranteed even when the terminals transmit signals at the same time.

Next, the scheme of using the orthogonal codes assigns each terminal to each channel, with all the given channels divided on the axis of time or frequency. This enables decoding of the receiving signals of each channel by a direct combining method because there is no interference between terminals, but increases use of channels by the number of terminals, thus reducing spectral efficiency.

As described earlier, in FIG. 5(a), the base station assigns the same resource to the terminals 100a and 100b. By this, the base station 200 may obtain a RF combining gain. At this time, the base station 200 may transmit to the terminals 100a and 100b a grant signal for the uplink resource including cooperative cluster information. Further, the signal may also include information on the method of assigning the resource by the permission signal terminal, modulation and coding level, or resource allocation position. At this time, the base station 200 may provide a phase shift or PMI (Precoding Matrix Index) to each terminal to increase the RF combining gain.

The cooperating terminal 100a or 100b synthesizes its own data with the counterpart terminal's data to thereby generate new data and may transmit the generated data to the base station 200. For example, the cooperating terminal 100a transmits its own data A to another cooperating terminal 100b, and the terminal 100b transmits its own data B to the cooperating terminal 100a. The cooperating terminal 100a synthesizes its data A with the data B of the cooperating terminal 100b to thereby generate new data and may transmit the generated data to the base station.

For example, the synthesis of data may be performed by a concatenation scheme and a permutation scheme.

For example, the concatenation scheme may be represented as in Equation 1:

$$[C_1 C_2 C_3 \ldots C_{2M}] = [A_1 A_2 A_3 \ldots A_M B_1 B_2 B_3 \ldots B_M] \quad \text{[Equation 1]}$$

For example, the permutation scheme may be represented as in Equation 2:

$$[C_1 C_2 C_3 \ldots C_{2M}] = [A_1 B_1 A_2 B_2 A_3 B_3 \ldots A_M B_M] \quad \text{[Equation 2]}$$

On the other hand, FIG. 5(b) illustrates assigning different resources to the two terminals 100a and 100b that cooperate with the base station 200.

As shown in FIG. 5(b), the base station 200 assigns different resources to the respective terminals in the time domain and/or frequency domain. By this, the base station may obtain a soft combining gain. Each terminal sends a request for an uplink resource to the base station 200, and the base station 200 transmits an permission signal for the uplink resource to each terminal. Each permission signal includes MS ID information for each terminal. Additionally, the permission signal may include information on the cooperative cluster. Further, the permission signal includes information on weight, resource allocating method, modulation and coding level, or resource allocation position.

Responding to the permission signal, each terminal may synthesize its data with the counterpart terminal's data and may transmit the synthesized data by using an uplink resource assigned thereto. As scheme of generating the synthesized data, there are the above-described concatenation scheme and permutation scheme. As such, the data synthesized by the terminals may be the same or different from each other. The situation that the data synthesized by the terminals are different from each other (for example, when terminal 100a generates C and terminal 100b generates D) may be represented, for example, in Equation 3 or 4:

$$[C_1C_2C_3 \ldots C_{2M}]=[A_1A_2A_3 \ldots A_M B_1B_2B_3 \ldots B_M],$$

$$[D_1D_2D_3 \ldots D_{2M}]=[B_1B_2B_3 \ldots B_M A_1A_2A_3 \ldots A_M] \quad \text{[Equation 3]}$$

$$[C_1C_2C_3 \ldots C_{2M}]=[A_1B_1A_2B_2A_3B_3 \ldots A_M B_M]$$

$$[D_1D_2D_3 \ldots D_{2M}]=[B_1A_1B_2A_2B_3A_3 \ldots B_M A_M] \quad \text{[Equation 4]}$$

Meanwhile, the synthesized data transmitted from the respective terminals may have different modulation levels and coding levels. For this, the information included in the permission signal for each terminal may include information separately defined for the MS ID of each terminal.

As described above, the base station 200 may transmit the permission signal that includes at least one of MS ID information and cooperative cluster information (e.g., cooperative cluster ID) for the terminals. At this time, the base station 200 may transmit each permission signal to each of the terminals that are in the cooperative transmission relationship with each other or may transmit the permission signal to only one representative terminal among the terminals that are in cooperative relationship. In such case, the cooperative clusters may receive the permission signal by using at least one of information, such as MS ID, of the representative terminal and information for the cluster. Some terminal that has the cooperative relationship may gather information of another terminal's information, and this may be addressed by transmitting the permission signal that has been subjected to masking with the cooperative cluster information. For example, the cooperative cluster information is ID of the cooperative cluster.

The cooperative cluster ID may be a value obtained by sequentially indexing the cluster information by the base station. Or, the cooperative cluster ID may be created by using some of the MS IDs of the terminals. Or, the ID of the cooperative cluster may be created by all or some of flow IDs of the terminals.

FIG. 6 illustrates an exemplary cooperative transmission method between terminals according to an embodiment.

In FIG. 6, a base station 200 generates a cooperative cluster, and information on the cooperative cluster is sent to a first terminal 100a and a second terminal 100b.

At this time, determination on which the first and second terminals 100a and 100b belonging to the cooperative cluster actually cooperate with each other to transmit data may be performed by the base station 200. Or, the determination on which the first and second terminals 100a and 100b belonging to the cooperative cluster actually cooperate with each other to transmit data may be performed by negotiation between the first and second terminals 100a and 100b.

In FIG. 6, the determination on which the first and second terminals 100a and 100b belonging to the cooperative cluster actually cooperate with each other to transmit data is performed by the base station 200.

When receiving a message containing the bandwidth request, such as an uplink resource allocation request message (for example, UL Grant Request UL Grant Request, BR Header, PBREH (Piggybacked bandwidth request extended header), P-FBCH (Primary Feedback channel) from each of the first and second terminals 100a and 100b, the base station 200 may determine whether the first and second terminals 100a and 100b belong to the same cooperative cluster based on the cooperative cluster information, and if the first and second terminals belong to the same cooperative cluster, may group the two terminals in the cooperative relationship.

Specific description will be as follows.

The base station 200 generates a cooperative cluster including the first terminal 100a and the second terminal 100b.

Subsequently, when receiving the uplink resource allocation request message (for example, UL grant request message) or bandwidth request message from each of the first terminal 100a and the second terminal 100b, the base station 200 determines whether the two terminals 100a and 100b belong to the same cooperative cluster, and if the two terminals belong to the same cooperative cluster, determines whether to group the terminals 100a and 100b in the cooperative relationship. When determining to group the two terminals 100a and 100b in the cooperative relationship, the base station 200 assigns the uplink resources to the terminals 100a and 100b for cooperative transmission (S160). The assignment of the uplink resources may be achieved by transmitting a permission signal, for example, UL grant message.

The permission signal, for example, UL grant message, may include information (e.g., MSID) on the partner of the cooperative transmission.

The base station 200 may generate and transmit the permission signal, for example, UL grant message, for the two terminals 100a and 100b. Or, the base station 200 may generate one permission signal, for example, UL grant message, and may transmit the permission signal to both or either of the two terminals 100a and/or 100b. In case that the signal is transmitted to only one terminal, the terminal that has received the signal or message may transfer the signal or message to the cooperating terminal. In case that the permission signal, for example, UL grant message, is separately generated and transmitted, each message may be identified as the ID of the terminal. In case that one permission signal, for example, UL grant message, is generated and transmitted to both the two terminals, the signal or message may include information on all the cooperating terminals and the signal or message may be identified as the ID of the cooperative cluster. Meanwhile, in case that the base station 200 generates one permission signal, for example, UL grant message, and transmits it to one terminal, the signal or message may be identified as the ID of the terminal (e.g., MSID) and the signal or message may include the DI of the cooperating terminal (for example, MSID).

Meanwhile, the first terminal 100a and the second terminal 100b, which have received the permission signal, for example, the UL grant message, share the data with each other and cooperatively transmit the shared data to the base station 200. The base station 200 may transmit a positive response message (e.g., ACK message or signal) or a negative response message (e.g., NACK message or signal) to one of the two terminals to thereby be able to respond to whether the data is received.

Figure 7:
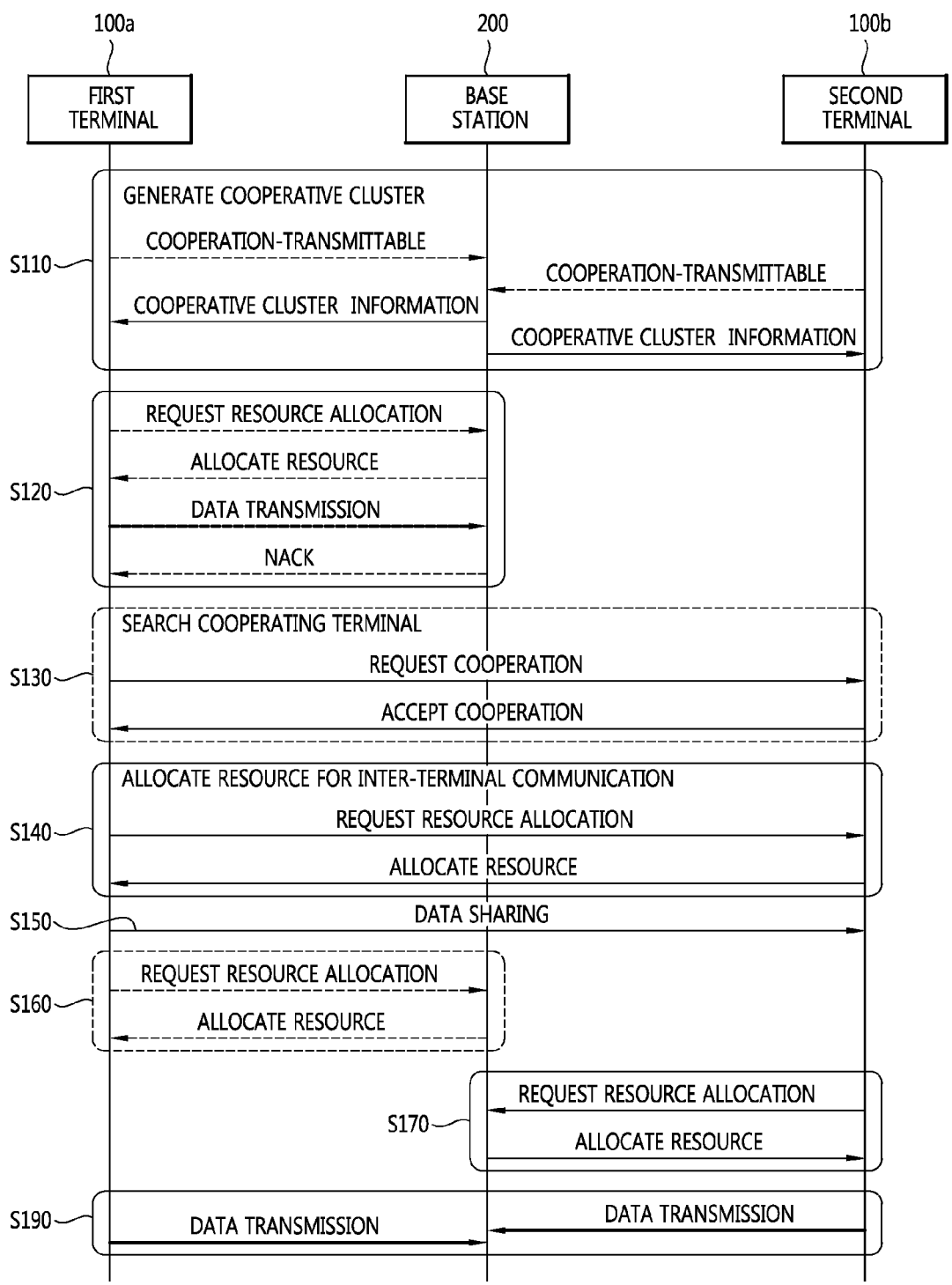
FIG. 7 illustrates a modified example of the method shown in FIG. 6.

FIG. 7 illustrates a modified example of the method shown in FIG. 6.

Referring to FIG. 7, similar to FIG. 6, the base station 200 generates a cooperative cluster and provides information on the cooperative cluster to the first and second terminals 100a and 100b. However, unlike in FIG. 6, in FIG. 7, the determination on whether the first and second terminals 100a and 100b belonging to the cooperative cluster actually cooperate with each other to transmit data may be performed through a terminal searching procedure S130. Further, unlike in FIG. 6, in FIG. 7, the inter-terminal resource allocating procedure S140 has been specifically shown. Further, in FIG. 7, in the cooperating terminal searching procedure S130, the first terminal 100a is a cooperation requesting terminal that requests cooperation, and the second terminal 100b is a cooperative transmission terminal that transmits data in response to the cooperation request. This is described in more detail below.

First, the cooperative cluster generating procedure S110 is described. The first terminal 100a and the second terminal 100b may each transmit a cooperation-transmittable message (or signal or indicator), which indicates that the cooperative transmission is possible, to the base station 200. At this time, in case that the base station 200 may be aware that the two terminals 100a and 100b are cooperable terminals based on, e.g., cooperative cluster information (cluster ID, etc.) of the two terminals 100a and 100b, the two terminals 100a and 100b may not transmit the cooperation-transmittable message or signal.

The base station 200 generates a cooperative cluster including the first terminal 100a and the second terminal 100b and transmits information on the generated cooperative cluster to the two terminals 100a and 100b. As described above, the base station 200 may generate the cooperative cluster including the first terminal 100a and the second terminal 100b by using information, such as CQI (Channel Quality Indicator) or SINR, which may be received from the terminal or the subscriber of the terminal, even without receiving the cooperation-transmittable message (or signal or indicator).

After generating the cooperative cluster, the base station 200 may provide an ID to the generated cooperative cluster and may transmit the cluster ID information. Further, the base station 200 may provide a MS temporary ID, which may discern the terminal in each cluster, while protecting information of each terminal, separately from the MSID (or STID) of each terminal, and may transmit the MS temporary ID to each terminal, with the MS temporary ID included in the cooperative cluster information.

As such, the cooperative cluster information including basic information, such as MS temporary ID or ID of the cooperative transmission cluster, for cooperative transmission may be transmitted by the base station 200 to each terminal periodically or when an event occurs.

Next, the first terminal 100a performs an initial data transmission procedure S120. Specifically, the first terminal 100a sends a request to the base station 200 through a resource allocation request message or signal, and if receiving a resource from the base station 200, transmits data. In response to such data transmission, the base station 200 may transmit a negative response (e.g., NACK signal or message).

As such, in case that the initial data transmission procedure S120 has been attempted but failed, a cooperating terminal searching procedure S130 may be carried out. Alternatively, even without performing the initial data transmission procedure S120, the cooperating terminal searching procedure S130 may be performed.

The cooperating terminal searching procedure S130 may be performed without the initial data transmission procedure S120, for example, for the reason that the channel state is not good.

The cooperating terminal searching procedure S130 is described. The first terminal 100a transmits a cooperation request message to the cooperable terminals belonging to the cooperative cluster based on the cooperative cluster information. In FIG. 7, in response to such cooperation request message, the second terminal 100b transmits a cooperation acceptance message to the first terminal 100a. The terminal accepting the cooperation request may be referred to as the cooperation attending terminal as described above.

Although in FIG. 7 the first terminal 100a transmits the cooperation request message to the cooperable terminals belonging to the cooperative cluster, the first terminal 100a may also transmit the cooperation request message to the base station 200. Then, the base station 200 may transfer the cooperation request message to the cooperable terminals belonging to the cooperative cluster.

Next, an inter-terminal resource allocating procedure S140 may be performed. Specifically, the first terminal 100a transmits a resource allocating request message to the second terminal 100b, i.e., cooperation attending terminal to request data cooperative transmission. The second terminal 100b, i.e., cooperation attending terminal, assigns a resource to the first terminal 100a, i.e., cooperation requesting terminal and transmits information on the assigned resource.

The cooperating terminal searching procedure S130 and the inter-terminal resource allocating procedure S140 may be merged as a single procedure.

For example, the inter-terminal resource allocating procedure S140 may be included in the cooperating terminal searching procedure S130. That is, the cooperation request message in the cooperating terminal searching procedure S130 may include a request for resource allocation, and the cooperation acceptance message may include information on the assigned resource. Alternatively, the cooperating terminal searching procedure S130 may be included in the inter-terminal resource allocating procedure S140. That is, the resource allocation request message in the inter-terminal resource allocating procedure S140 may include a cooperation request, and the resource allocation message may include cooperation acceptance.

Next, a data sharing procedure S150 is performed. That is, when receiving a resource from the second terminal 100b, the first terminal 100a transmits its data to the second terminal 100b for sharing.

Then, a resource allocating procedure S160 or S171 may be performed by the base station. Specifically, one or more of the first terminal 100a and the second terminal 100b are assigned with an uplink resource from the base station 200 (S160 or S170). At this time, in case that the first terminal 100a has been assigned with a resource through the initial data transmission procedure S120, the resource allocating procedure S160 of the first terminal 100a may not be performed.

Thereafter, a cooperative transmission procedure S1900 may be performed. In the cooperative transmission procedure S190, as shown in FIG. 7, the first terminal 100a and the second terminal 100b both may transmit data or only the second terminal 100b may transmit data of the first terminal 100a.

Modified Example of Each of Procedures Shown in FIG. 7 and Examples of Information Transmitted/Received The flow of each procedure has been described thus far. Hereinafter, modified examples of each procedure and information transmitted/received in each procedure will be described in greater detail.

At this time, the modified examples of the above-described procedures may be divided into modified examples taken when the initial data transmission procedure S120 is performed, modified examples taken when the initial data transmission procedure S120 is not performed, and commonly applicable modified examples, and each of the modified examples is hereinafter described.

First, the modified examples taken when the initial data transmission procedure S120 is performed are described below.

The Initial data transmission procedure S120 and the cooperating terminal searching procedure S130 may be merged as a single procedure. For example, the resource allocation request message in the Initial data transmission procedure S120 may include the cooperation request message or indicator.

Such cooperation request message or indicator includes at least one of the following types of information:

Indicator indicating cooperation request
Identification information of cooperation requesting terminal. For example, MSID (or STID) of the cooperation requesting terminal and temporary ID of the cooperation requesting terminal Meanwhile, in case that the first terminal 100a receives a resource allocation message from the base station 200 through the Initial data transmission procedure S120, the base station 200 may previously assign an uplink resource for cooperative transmission to one or more of the first terminal 100a and the second terminal 100b. Further, when transmitting the resource allocation message in the Initial data transmission procedure S120, the base station 200 may transmit an uplink resource message including information on the uplink resource assigned for the cooperative transmission to the first terminal 100a together with or separately from the resource allocation message. Further, the base station 200 may transmit it to the second terminal 100b through a separate message.

As such, in case that the uplink resource for cooperative transmission is assigned in advance, neither the resource allocating procedure S160 by the first terminal 100a nor the resource allocating procedure S170 by the second terminal 100b may be performed.

As the uplink resource allocation message including information on the uplink resource assigned by the base station 200 for cooperative transmission, the message transmitted to one of the first terminal 100a and the second terminal 100b may include one of the following types of information:

Cooperative cluster ID
Identification information of cooperation requesting terminal, which may include one or more of MSID (or STID) of cooperation requesting terminal and temporary ID of the cooperation requesting terminal
Base station uplink resource allocation information for cooperation requesting terminal, which may include one or more of size of allocated resource, position of allocated resource, modulation and coding level (MCS), and MIMO information (e.g., MIMO scheme, PMI, rank indicator, etc.)
Identifying of cooperative transmission terminal, which may include one or more of MSID (or STID) of cooperative transmission terminal and temporary ID of cooperative transmission terminal
Base station uplink resource allocation information for cooperative transmission terminal, which may include one or more of size of allocated resource, position of allocated resource, modulation and coding level (MCS), and MIMO information (MIMO scheme, PMI, rank indicator, etc.)

The CRC of such resource allocation message may be masked with one of the MSID (or STID) of the terminal, temporary ID of the terminal, and cooperative cluster ID. In particular, for the base station to easily support RF combining, the CRC of the uplink resource allocation message is preferably masked with common information regarding the terminals that are in cooperative transmission relationship. At this time, the common information regarding the terminals may be one of the following types of information:

Cooperative cluster ID of terminal
Combination of some or all of temporary IDs of terminals, which is i) concatenation for some or all of the temporary IDs of the terminals that are in cooperative transmission relationship, or ii) permutation for some or all of the temporary IDs of the terminals that are in cooperative transmission relationship.
Combination of some or all of MSIDs or STIDs of the terminals, which is i) concatenation for some or all of the MSIDs (or STIDs) of the terminals that are in cooperative transmission relationship, or ii) permutation for some or all of the MSIDs (or STIDs) of the terminals that are in cooperative transmission relationship.
Temporary ID of cooperation requesting terminal
MSID (or STID) of cooperation requesting terminal Meanwhile, the initial data transmission procedure S120 and the inter-terminal resource allocating procedure S140 may be merged as a single procedure. For example, if the first terminal 100a transmits the resource allocation request message in the initial data transmission procedure S120 to the base station 200, the base station 200 may transmit the resource allocation request message between the terminals in the procedure S140 to the cooperable terminals, for example, the second terminal 100b, which belong to the cooperative cluster instead of the first terminal 100a. In such case, the cooperable terminal, that is, the second terminal 100b, transmits the resource allocation message between terminals in the procedure S140 to the base station 200 and the base station 200 may transfer the received resource allocation message to the first terminal 100a.

The resource allocation message transmitted from the base station 200 to the first terminal 100a may include at least one of the following types of information:

Cooperative cluster ID
Identification information of cooperation requesting terminal, which may include one or more of MSID (or STID) of requesting terminal and temporary ID of requesting terminal
Identification information of cooperation requesting terminal, which may include one or more of MSID (or STID) of cooperative transmission terminal and temporary ID of cooperative transmission terminal
Resource allocation information for communication between terminals, which may include one or more of size of allocated resource, position of allocated resource, modulation and coding level (MCS), MIMO information (MIMO scheme, PMI, rank indicator, etc.), transmission power information (Tx power, power ratio, etc.), and ACK/NACK transmission position.

In case that all the terminals that are in cooperative transmission relationship refer to the resource allocation message, the process may be simplified. For example, the CRC of the resource allocation message for inter-terminal communication may be masked with the common information regarding the above-mentioned terminals. In case that a separate resource allocation message is transmitted to a specific cooperative transmission terminal, the corresponding resource allocation message may be discerned/identified by using the identifier of the corresponding terminal. In such case, there is the disadvantage that the cooperative transmission terminal should transmit the resource allocation message to the cooperation requesting terminal again.

Second, the modified examples taken when the initial data transmission procedure S120 is not performed are described below.

As described above, the terminal searching procedure S130 and the inter-terminal resource allocating procedure S140 may be merged as a single procedure.

As a modified example of the inter-terminal resource allocating procedure S140, the first terminal 100a which is a cooperation requesting terminal may transmit information on the requested resource to the second terminal 100b which is cooperable terminal. That is, the cooperation requesting terminal, i.e., the first terminal 100a, may previously determine a desired position, size, and transmission method and informs this to the cooperable terminal, i.e., the second terminal 100b.

Finally, the modified examples commonly applicable irrespective of whether the initial data transmission procedure S120 is performed are described below.

In the terminal searching procedure S130, the base station 200 may transmit the cooperation request message to the second terminal 100b instead of the first terminal 100a as in the examples described above.

At this time, the cooperation request message transmitted by the base station 200 instead of the first terminal 100a includes at least one of the following types of information for the second terminal 100b to be able to receive a subsequent message (for example, resource allocation request message or data of the first terminal 100a) or to transmit a subsequent message (for example, resource allocation message):

Cooperation request indicator
Identification information of cooperation requesting terminal, which may include one or more of MSID (or STID) of cooperation requesting terminal and temporary ID of cooperation requesting terminal.
Cooperative cluster ID of cooperation requesting terminal The resource allocation request message transmitted by the first terminal 100a in the inter-terminal resource allocating procedure S140 may include at least one of the following types of information:

Cooperation request indicator
Identification information of cooperative transmission terminal, which may include one or more of MSID (or STID) of cooperative transmission terminal and temporary ID of cooperative transmission terminal
Resource allocation request information for inter-terminal communication, which may include transmission data size, QoS of transmission data, and data type (e.g., FID).
Resource allocation information for inter-terminal communication, which may include one or more of transmission data size, transmission data position, data transmission method (MIMO scheme, PMI, MCS, etc.), data transmission power (transmit power, power headroom, etc.), and ACK/NACK transmission position.

Further, the resource allocation message transmitted from the cooperable terminal may include at least one of the following types of information:

Cooperative transmission acceptance indicator
Identification information of cooperative transmission terminal, which may include one or more of MSID (or STID) of cooperative transmission terminal and temporary ID of cooperative transmission terminal.
Resource allocation information, which may include one or more of size of allocated resource, position of allocated resource, modulation and coding level (MCS), MIMO information (MIMO scheme, PMI, rank indicator, etc.), transmission power information (Tx power, power ratio, etc.), and ACK/NACK transmission position.

Such resource allocation request and allocation message is likely to be put in danger of infringement of information security, it is preferred to be able to detect the message with the temporary ID of the terminal. That is, the CRC of the corresponding message may be masked with the temporary ID of the cooperation requesting terminal.

Meanwhile, before the procedures S130 and S140 are performed, the base station 200 may also perform a procedure for getting the cooperable terminal ready for cooperation. For this, the base station 200 may transmit the positive traffic indicator to the second terminal 100b so that the second terminal 100b wakes up from the sleep mode or may transmit the paging message to the second terminal 100b so that the second terminal 100b escapes from the idle mode.

Figure 8:
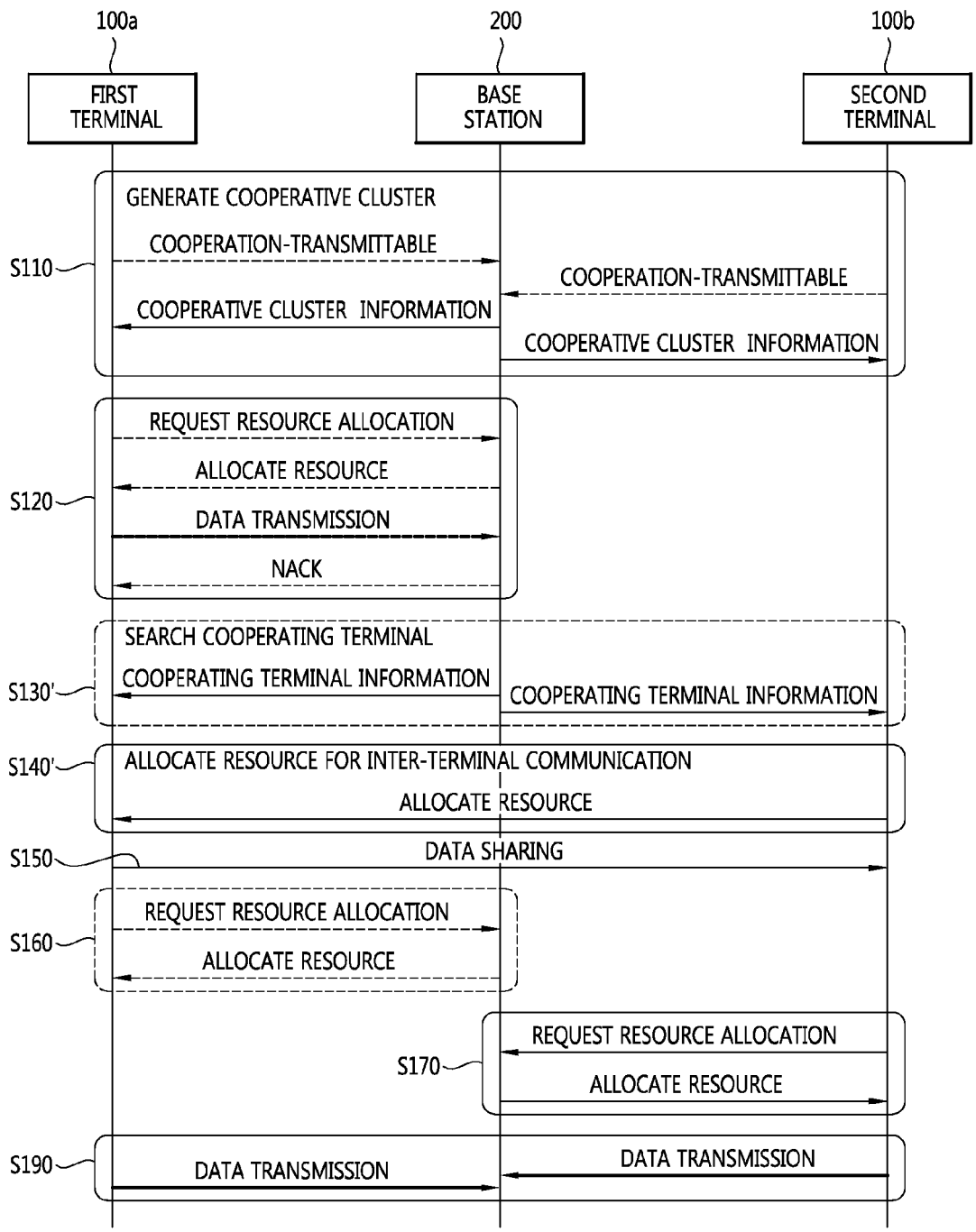
FIG. 8 illustrates a modified example of the method illustrated in FIG. 6.

FIG. 8 illustrates a modified example of the method illustrated in FIG. 6.

Referring to FIG. 8, similar to FIGS. 6 and 7, the base station 200 generates a cooperative cluster and sends information on the cooperative cluster to the first terminal 100a and the second terminal 100b.

However, in FIG. 8, a cooperating terminal searching procedure S130' and an inter-terminal resource allocation procedure S140' are modified to be different from those in FIG. 7.

Hereinafter, different parts from those described in connection with FIG. 7 will be primarily described while the same parts as those described in connection with FIG. 7 are not repeatedly described.

In the modified cooperating terminal searching procedure S130', even without receiving any cooperation request, the base station 200 determines terminals with which to cooperate and transmit information regarding the cooperating terminal to the terminals determined to cooperate with each other. According to the modified inter-terminal resource allocation procedure, even without receiving an inter-terminal resource allocation request, the second terminal 100b may transmit the resource allocation message to the first terminal 100a. At this time, the second terminal 100b may transmit the resource allocation message to the base station 200, and the base station 200 may transmit the resource allocation message to the first terminal 100a.

Besides, each procedure illustrated in FIG. 8 is similar to the procedure shown in FIG. 7 and thus the same description applies to the procedures in FIG. 8.

Modified Examples of the Procedures Shown in FIG. 8 and Examples of Information Transmitted/Received Hereinafter, modified examples of each procedure and information transmitted/received during each procedure will be described in detail.

At this time, the modified examples may be divided into modified examples taken when the initial data transmission procedure S120 is performed, modified examples taken when the initial data transmission procedure S120 is not performed, and modified examples that may be commonly applicable, and each modified example is hereinafter described.

First, the modified examples taken when the initial data transmission procedure S120 is performed are described below.

The initial data transmission procedure S120 and the cooperating terminal searching procedure S130' may be merged as a single procedure. For example, the resource allocation message in the initial data transmission procedure S120 may include information on the cooperating terminals determined by the base station 200 in the procedure S130'—for example, cooperating terminal information.

Meanwhile, in case that the first terminal 100a receives the resource allocation message from the base station 200 through the initial data transmission procedure S120, the base station 200 may previously assign the uplink resource for cooperative transmission to one or more of the first terminal 100a and the second terminal 100b. When transmitting the resource allocation message in the initial data transmission procedure S120, the base station 200 may transmit to the first terminal 100a the uplink resource message including information on the uplink resource assigned for cooperative transmission together with or separately from the resource allocation message. Further, the base station 200 may transmit it to the second terminal 100b through a separate message.

As such, in case that the uplink resource for cooperative transmission is previously assigned, the resource allocating procedure S160 by the first terminal 100a and the resource allocating procedure S170 by the second terminal 100b may not be performed.

The resource allocation message for cooperative transmission may include the following types of information:

Grant type indicator for cooperative transmission, which indicates that the corresponding resource allocation message is a resource allocation message for uplink transmission through cooperative transmission between terminals.

Cooperative cluster ID

Identification information of cooperation requesting terminal, which may include MSID (or STID) of cooperation requesting terminal and temporary ID of cooperation requesting terminal Uplink resource allocation information of base station for cooperation requesting terminal, which may include one or more of size of allocated resource, position of allocated resource, modulation and coding level (MCS), and MIMO information (MIMO scheme, PMI, rank indicator, etc.).

Identification information of cooperative transmission terminal, which may include one or more of MSID (or STID) of cooperative transmission terminal and temporary ID of cooperative transmission terminal.

Meanwhile, when the base station 200 transmits the uplink resource allocation information to the first terminal 100a, uplink resource allocation information of the cooperative transmission terminal, that is, second terminal 100b, may be transmitted together. At this time, the uplink resource allocation information transmitted to the first terminal 100a may include the following information:

Uplink resource allocation information for cooperative transmission terminal (for example, second terminal), which may include one or more of size of allocated resource, position of allocated resource, modulation and coding level (MCS), MIMO information (MIMO scheme, PMI, rank indicator, etc.).

Such uplink resource allocation information may be transmitted to the first terminal 100a alone or to both the first terminal 100a and the second terminal 100b. In case that the uplink resource allocation information is transmitted to both the first terminal 100a and the second terminal 100b, the uplink resource allocation information may be the same or different.

Meanwhile, the initial data transmission procedure S120 and the inter-terminal resource allocating procedure S140' may be merged as a single procedure. For example, if the first terminal 100a transmits the resource allocation request message in the initial data transmission procedure S120 to the base station 200, the base station 200 may transmit the resource allocation request message between the terminals in the procedure S140 to the cooperable terminals belonging to the cooperative cluster—for example, the second terminal 100b—instead of the first terminal 100a. However, for this, the base station 200 may have been aware of link information between the terminals. For this, the cooperable terminal, i.e., the second terminal 100b, may transmit the resource allocation message between terminals in the procedure S140' to the base station 200, and the base station 200 may transmit the received resource allocation message to the first terminal 100a.

The resource allocation message for resources between terminals, which is transmitted from the base station 200 to the first terminal 100a may include at least one of the following types of information. For this, a restrictive modulation and coding level should apply to inter-terminal communication.

Uplink resource allocation information (resource allocation information for inter-terminal communication) of cooperation requesting terminal for cooperative transmission terminal, which may include one or more of size of allocated resource, position of allocated resource, modulation and coding level (MCS), MIMO information (MIMO scheme, PMI, rank indicator, etc.), and transmission power information (Tx Power, power ratio, etc.).

Meanwhile, the cooperating terminal searching procedure S130' and the inter-terminal resource allocating procedure S140' may be merged as a single procedure.

For example, in the cooperating terminal searching procedure S130', the cooperating terminal information transmitted from the base station 200 to the cooperation requesting terminal, i.e., first terminal 100a, may include the following information:

Grant type indicator for cooperative transmission, which may be an indicator that indicates resource allocation information transmitted from the base station to the cooperation requesting terminal or an indicator that indicates resource information assigned by the cooperative transmission terminal to the cooperation requesting terminal for inter-terminal communication received by the cooperative transmission terminal. That is, the cooperation requesting terminal may transmit data to the cooperative transmission terminal through the corresponding resource region.

Cooperative cluster ID

MSID (or STID) of cooperation requesting terminal

Temporary ID of cooperation requesting terminal

Resource allocation information for inter-terminal communication, which is resource allocation information transmitted from the cooperative transmission terminal to the cooperation requesting terminal.

The CRC of the corresponding resource allocation information may be masked with one of MSID (or STID) of the cooperation requesting terminal, temporary ID of the cooperation requesting terminal, and cooperative cluster ID.

As another example, in the cooperating terminal searching procedure S130', the cooperating terminal information transmitted from the base station 200 to the cooperative transmission terminal, i.e., second terminal 100b, may include the following types of information:

Grant type indicator for cooperative transmission, which indicates resource allocation information transmitted from the base station to the cooperative transmission terminal. Or, the indicator may be an indicator that indicates resource information assigned to the cooperation requesting terminal by the cooperative transmission terminal for inter-terminal communication received by the cooperative transmission terminal. That is, as the resource allocation information transmitted from the base station to the cooperative transmission terminal, the cooperative transmission terminal performs communication with the cooperative transmission terminal using the corresponding resource.

Cooperative cluster ID

Identification information of cooperation requesting terminal, which may include MSID (or STID) of cooperation requesting terminal or temporary ID of cooperation requesting terminal Identification information of cooperative transmission terminal, which may include MSID (or STID) of cooperative transmission terminal or temporary ID of cooperative transmission terminal.

Uplink resource allocation information, which is resource allocation information for cooperative transmission terminal. Such uplink resource allocation information may include one or more of size of allocated resource, position of allocated resource, modulation and coding level (MCS), MIMO information (MIMO scheme, PMI, rank indicator, etc.) and transmission power information (Tx power, power ratio, etc.).

Resource allocation information for inter-terminal communication, which is resource allocation information transmitted from the cooperative transmission terminal to the cooperation requesting terminal. This information may include size of allocated resource, position of allocated resource, modulation and coding level (MCS), MIMO information (MIMO scheme, PMI, rank indicator, etc.) transmission power information (Tx power, power ratio, etc.), and ACK/NACK transmission position.

The CRC of the corresponding resource allocation information may be masked with one of MSID (or STID) of the cooperative transmission terminal, temporary ID of the cooperative transmission terminal, and cooperative cluster ID.

Meanwhile, as a modified example, the resource allocation information for inter-terminal communication transmitted from the base station 200 may be simply configured of allocation size and/or position. In such case, the terminals which are in cooperative transmission relationship determine detailed resource allocation information and control information necessary for data transmission while sending and receiving control information to/from each other.

As another modified example, the resource allocation information for inter-terminal communication provided from the base station 200 provides all the resource allocation information necessary for data transmission. In such case, the cooperation requesting terminal transmits data according to the information received from the base station and the cooperative transmission terminal receives data according to the information determined by the base station.

Figure 9:
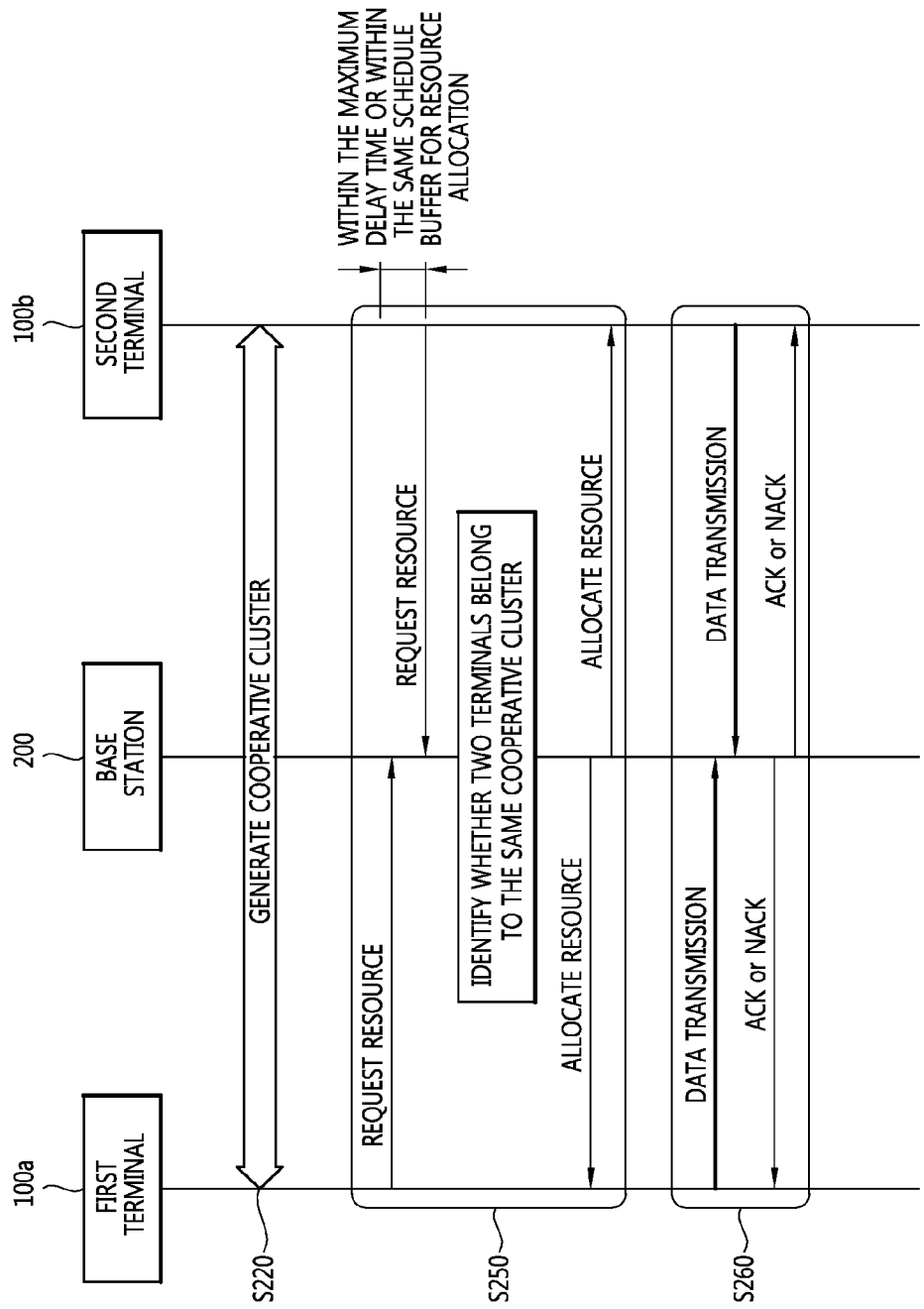
FIG. 9 illustrates a method of performing cooperative transmission between terminals according to another embodiment.

FIG. 9 illustrates a method of performing cooperative transmission between terminals according to another embodiment. In FIG. 9, the terminals, e.g., the first terminal 100a and the second terminal 100b, generate a cooperative cluster, and the base station 200 obtains the generated cooperative cluster information and then establishes a cooperative transmission relationship between the terminals.

At this time, the base station 200 may determine whether the first terminal 100a and the second terminal 100b belonging to the cooperative cluster are to actually cooperate with each other to transmit data.

As shown in FIG. 9, the determination on whether the first terminal 100a and the second terminal 100b belonging to the cooperative cluster actually cooperate with each other to transmit data is performed by the base station 200.

Upon receiving the uplink resource allocation request message (e.g., UL grant request message) including the cooperative cluster information or bandwidth request message from the first terminal 100a and second terminal 100b, the base station 200 may determine whether the first terminal 100a and the second terminal 100b belong to the same cooperative cluster based on the cooperative cluster information, and if the terminals belong to the same cooperative cluster, may put the two terminals in a cooperation relationship.

This is described below in detail.

The terminals, i.e., the first terminal 100a and the second terminal 100b, generate a cooperative cluster that includes the terminals (S220). Or, a network entity other than the base station 200 may generate the cooperative cluster including the first terminal 100a and the second terminal 100b, and the base station 200 may be not aware of existence of the generated cooperative cluster.

Subsequently, each of the first terminal 100a and the first terminal 100a may transmit the uplink resource allocation request message (e.g., UL grant request message) or bandwidth request message including information on the generated cooperative cluster to the base station. Or, in case that the network entity other than the base station 200 generates the cooperative cluster including the first terminal 100a and the second terminal 100b, the resource allocation request message or bandwidth request message transmitted from each terminal may not include the information on the cooperative cluster.

The base station 200 determines whether the two terminals 100a and 100b belong to the same cooperative cluster, and if they belong to the same cooperative cluster, determines whether to put the two terminals 100a and 100b in a cooperation relationship. When determining to put the two terminals 100a and 100b in the cooperation relationship, the base station 200 allocates the uplink resources to the two terminals 100a and 100b (S250). The assignment of the uplink resources may be achieved by transmitting a permission signal, e.g., UL grant message.

That is, in case that the terminals 100a and 100b belonging to the same cooperative cluster transmit the bandwidth request message or uplink resource allocation request message at the similar time (within a time that scheduling may be simultaneously done), the base station 200 may assign the resources to the terminals by considering cooperative transmission. At this time, the message including the information for the assigned resources may include permission of resources necessary for inter-terminal communication as well as permission of resources for uplink of the base station. The permission signal, e.g., UL grant message, may include information (e.g., MSID, etc.) on the partner of cooperative transmission.

The base station 200 may generate the permission signal, e.g., UL grant message, for each of the two terminals 100a and 100b and may transmit the generated permission signal.

Or, the base station 200 may generate a single permission signal, e.g., UL grant message, and may transmit the permission message to both the terminals 100a and 100b or to one of the terminals 100a and 100b. In case that the permission signal is transmitted to only one terminal, the terminal receiving the signal or message may transmit the signal or message to the cooperating terminal. In case that the permission signal, e.g., UL grant message is generated for each terminal and transmitted, each message may be identified by the ID of the terminal. In case that the base station 200 generates a single permission signal, e.g., UL grant message and transmits the permission signal to both the terminals, the signal or message may include information on all the cooperating terminals, and the signal or message may be identified by the ID of the cooperative cluster. Meanwhile, in case that the base station 200 generates a single permission signal, for example, UL grant message, and transmits it to one terminal, the signal or message may be identified by the ID (e.g., MSID) of the terminal, and the signal or message may include ID (e.g., MSID) of the cooperating terminal.

Meanwhile, the first terminal 100a and the second terminal 100b receiving the permission signal, for example, UL grant message, share the data with each other and cooperate with each other to send the shared data to the base station 200. The base station 200 transmits a positive response message (e.g., ACK message or signal) or negative response message (e.g., NACK message or signal) to one or more of the two terminals, thereby responding to whether to receive the data (S260).

At this time, the first terminal 100a and the second terminal 100b receiving the permission signal, for example, UL grant message, should transmit data in a predetermined time interval. This is referred to as 'time relevance'. Such time relevance occurs because it takes time for the terminal to decode the UL grant message and to encode the packet to be transmitted according to the content. In case of cooperative transmission, after receiving the UL grant, data exchange between terminals may be performed. Accordingly, additional time is needed for resource request/resource allocation/data exchange between the terminals. Thus, in case of cooperative transmission, changing time relevance may be informed by the base station 200, or the time relevance may be changed by a predetermined time by the base station 200 and two terminals 100a and 100b.

Figure 10:
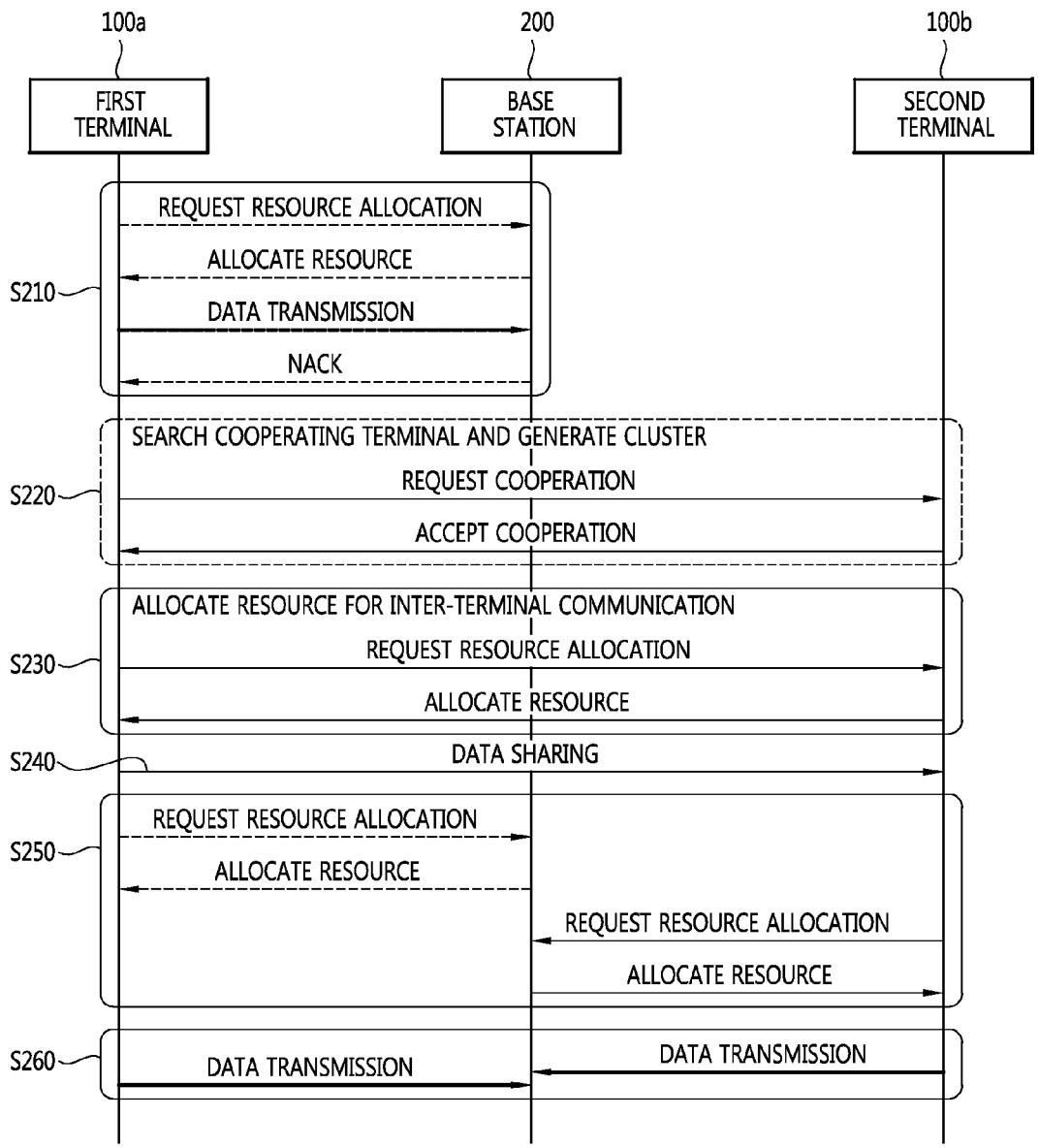
FIG. 10 illustrates a modified example of the method illustrated in FIG. 9.

FIG. 10 illustrates a modified example of the method illustrated in FIG. 9.

FIG. 10 is similar to FIGS. 7 to 9. However, in FIG. 10, a cooperative cluster may be generated through a cooperating terminal searching procedure unlike in FIG. 9.

Accordingly, the description primarily focuses on the differences and similar parts are not repetitively described.

The first terminal 100a performs an initial data transmission procedure S210. Specifically, the first terminal 100a sends a resource allocation request message or signal to the base station 200 for resource allocation, and when the base station 200 assigns a resource to the first terminal 100a, the first terminal 100a transmits data. In response to such data transmission, the base station 200 may transmit a negative response (for example, NACK signal or message).

As such, in case that the initial data transmission procedure S210 is performed but fails, a cooperating terminal searching and cluster generating procedure S220 may be performed. Alternatively, even without performing the initial data transmission procedure S210, the cooperating terminal searching and cluster generating procedure S220 may be performed.

For example, when channel state is not good, the cooperating terminal searching and cluster generating procedure S220 may be performed without the initial data transmission procedure S210.

Next, the cooperating terminal searching and cluster generating procedure S220 is described. As described above, in case of performing the initial data transmission procedure S210 but failing or without performing the initial data transmission procedure S210, the first terminal 100a and the second terminal 100b generate the cooperative cluster (S220). Specifically, when generating the cooperative cluster, the first terminal 100a sends a request of cooperation to the second terminal 100b, and if the second terminal 100b accepts the request of cooperation, the first terminal 100a and the second terminal 100b put each other in the cooperative cluster.

At this time, the cooperation requesting terminal, i.e., the first terminal 100a, may generate and assign a cooperative cluster ID while sending a request of cooperation to another terminal. Or, the cooperation-transmittable terminal, for example, second terminal 100b may generate and assign the cooperative cluster ID while accepting the request of cooperation. Further, the first terminal 100a or the second terminal 100b may generate and assign a unique temporary ID that may discern the terminal in the corresponding cooperative cluster.

Then, a resource allocating procedure S230 for inter-terminal communication is performed. This procedure is similar to procedure S140 of FIG. 7, and repetitive description thereof is omitted. On the other hand, the cooperating terminal searching and cluster generating procedure S220 and the resource allocating procedure S230 may be merged as a single procedure. This may be easily understood by those skilled in the art from the description on FIGS. 7 and 8, and thus, further detailed description is skipped.

Next, a data sharing procedure S240 is performed. This procedure is similar to procedure S140 of FIG. 7, and further description thereof is skipped.

Thereafter, procedures S250 and S260 of FIG. 9 are likewise performed. Such procedures refer to the above description and further detailed description is skipped. It should be noted that the resource allocation request by the second terminal 100b in the procedure S250 may be omitted. In other words, in case that the uplink resource assigned to the first terminal 100a is used as is by the second terminal 100b, the second terminal 100b may be not separately assigned with an uplink resource.

Modified Examples of the Procedures Shown in FIG. 10 and Examples of Transmitted/Received Information The flow of each procedure has been described thus far. Hereinafter, modified examples of each procedure and information transmitted/received in each procedure are described in detail.

In the procedure S220, the cooperation request message (i.e., cooperation requesting terminal or cooperable terminal) transmitted from the first terminal 100a to the second terminal 100b may include at least one of the following types of information:

Cooperation request identifier, which is an indicator indicating a cooperation request transmitted from the first terminal to the second terminal Identification information of cooperation requesting terminal (for example, first terminal), which may include MSID (or STID) of cooperation requesting terminal and temporary ID of cooperation requesting terminal.

Cooperative cluster ID of cooperation requesting terminal

Channel information for base station uplink of cooperation requesting terminal, which may include CQI for the base station uplink and SINR for the base station uplink (or downlink).

Resource allocation request information of cooperation requesting terminal, which includes at least one of the following types of information: data information to be transmitted by terminal (data size (original information size), QoS, etc.) and uplink resource allocation information received from base station (for example, resource location, allocation size, modulation & coding level, MIMO scheme, PMI, etc. or for example, data size (grant information size), QoS, etc.)

Meanwhile, as described above, procedure 220 and procedure 230 may be merged as a single procedure.

First, the resource allocation request message in procedure S230 may be included in the cooperation request message in procedure S220. On the contrary, although merged, the first terminal may transmit the cooperation request message and the resource allocation request message separately from each other.

At this time, the cooperation request message of the first terminal 100a includes at least one of the following types of information. That is, the cooperation requesting terminal, i.e., the first terminal 100a, may request cooperative transmission including the resource allocation request information.

Cooperation request indicator, which may be an indicator indicating a cooperation request transmitted from a terminal to another terminal or may be an indicator indicating a cooperation request and resource allocation request transmitted from a terminal to another terminal Identification information of cooperation requesting terminal, which may include MSID (or STID) of cooperation requesting terminal or temporary ID of cooperation requesting terminal.

Cooperative cluster ID of cooperation requesting terminal

Channel information for base station uplink of cooperation requesting terminal, which may include CQI for base station uplink and reception SINR for base station uplink (or downlink).

Resource allocation request information of cooperation requesting terminal, which may include data information (for example, data size (original information size), QoS, etc.) of a terminal, which is to be transmitted.

Meanwhile, in case that procedure S220 and procedure S230 are merged as a single procedure, the cooperation acceptance message of the cooperable terminal, i.e., the second terminal 100b, in procedure S220 may include resource allocation information. Such cooperation acceptance message includes at least one of the following types of information:

Cooperation acceptance (confirmation) indicator, which may indicate a cooperative transmission message transmitted from the cooperative transmission terminal to the cooperation requesting terminal or may be a resource allocation message transmitted from the cooperative transmission terminal to the cooperation requesting terminal.

Identifier of cooperative transmission terminal, which may include MSID (or STID) of cooperative transmission terminal, temporary ID of cooperative transmission terminal, and cooperative cluster ID of cooperative transmission terminal (which is the same as the cooperative cluster ID of cooperation requesting terminal).

Identifier of cooperation requesting terminal, which may include MSID (or STID) of cooperation requesting terminal, temporary ID of cooperation requesting terminal, and cooperative cluster ID of cooperation requesting terminal.

Resource allocation information for cooperation requesting terminal, which may include resource allocation information (resource size, resource location, MCS, etc.), information on transmission scheme (for example, MIMO scheme, PMI, rank indicator, etc.), and information on ACK/NACK transmission position.

Meanwhile, in case that procedure S220 and procedure S230 are merged as a single procedure, the resource allocation information may be included in the cooperation request message transmitted from the first terminal 100a to the cooperable terminal. That is, the position, size, and transmission scheme desired by the cooperation requesting terminal are previously determined, and notified to the cooperable terminal. In such case, the resource allocation request information mentioned above is replaced by the scheme that includes at least one of the following types of information:

Resource allocation information of cooperation requesting terminal, which may include one or more of size of transmission data, position of transmission data, data transmission scheme (MIMO scheme, PMI, MCS, etc.), data transmission power (transmit power, power headroom, etc.), and ACK/NACK transmission position information.

Meanwhile, in case that procedures S220 and S230 are merged as a single procedure, the cooperation request message may be included in the resource allocation request message in procedure S230. At this time, the resource allocation request message includes at least one of the following types of information:

Cooperation request indicator, which may be an indicator indicating the resource allocation request between terminals, which is transmitted from a terminal to another terminal.

Identification information of cooperation requesting terminal, which may include MSID (or STID) of cooperation requesting terminal and temporary ID of cooperation requesting terminal.

Cooperative cluster ID of cooperating terminal

Identification information of cooperative transmission terminal, which may include MSID (or STID) of cooperative transmission terminal and temporary ID of cooperative transmission terminal.

Channel information for base station uplink of cooperation requesting terminal, which may include CQI for base station uplink and reception SINR for base station uplink (or downlink).

Resource allocation request information of cooperation requesting terminal, which may include data information of terminal to be transmitted (for example, data size (original information size), QoS, etc.) and resource allocation information received from the base station (for example, resource location, allocation size, modulation & coding level, MIMO scheme, PMI or, e.g., data size (grant information size), QoS, etc.)

Meanwhile, as a modified example of procedure S230, the first terminal 100a, which is the cooperation requesting terminal, may transmit information on the requested resource to the second terminal 100b, which is the cooperable terminal. That is, the cooperation requesting terminal, i.e., the first terminal 100a, previously determines the desired position, size, and transmission scheme and notifies this to the cooperable terminal, i.e., the second terminal 100b. The information on the requested resource may include the following information:

Resource allocation information of cooperation requesting terminal, which may include one or more of transmission data size, transmission data position, data transmission scheme (MIMO scheme, PMI, MCS, etc.), data transmission power (transmit power, power headroom, etc.), and ACK/NACK transmission position.

The resource request information may include the cooperation request of the second terminal.

The CRC of the message including such information may be masked with one of MSID (or STID) of the cooperation requesting terminal, temporary ID of cooperation requesting terminal, and cooperative cluster ID.

Meanwhile, in procedure S230, the resource allocation message of the cooperable terminal, i.e., the second terminal 100b, (cooperable terminal cooperation requesting terminal) may include at least one of the following types of information:

Cooperative transmission acceptance indicator (Cooperation Acceptance (Confirmation) Indicator), which may indicate the resource allocation message transmitted from the cooperative transmission terminal to the cooperation requesting terminal.

Identifier of cooperative transmission terminal, which may include MSID (or STID) of cooperative transmission terminal, temporary ID of cooperative transmission terminal, and cooperative cluster ID of cooperative transmission terminal (which is the same as the cooperative cluster ID of cooperation requesting terminal).

Identifier of cooperation requesting terminal, which may include MSID (or STID) of cooperation requesting terminal, temporary ID of cooperation requesting terminal, and cooperative cluster ID of cooperation requesting terminal.

Resource allocation information for cooperation requesting terminal, which may include transmission data size, transmission data position, data transmission scheme (MIMO scheme, PMI, MCS, etc.), data transmission power (transmit power, power headroom, etc.), and ACK/NACK transmission position.

Meanwhile, since in procedure S250 the data received through the uplink resource assigned to the first terminal 100a and the second terminal 100b should be identified as data of the first terminal 100a, the resource allocation request message transmitted from the second terminal 100b to the base station 200 in procedure S250 may include the following types of information:

Identification information of cooperative transmission terminal, which may include MSID (or STID) of cooperative transmission terminal or temporary ID of cooperative transmission terminal.

Identification information of cooperation requesting terminal, which may include MSID (or STID) of cooperation requesting terminal or temporary ID of cooperation requesting terminal.

Cooperative cluster ID of cooperation requesting terminal

Resource allocation request information of cooperation requesting terminal, which may include information, such as data size (original information size), and QoS.

Meanwhile, in procedure S250, without separately sending an uplink resource allocation request to the base station 200, the second terminal 100b may transmit data by using the uplink resource assigned by the base station 200 to the first terminal 100a.

Or, in procedure S250, the first terminal 100a and the second terminal 100b may be respectively assigned with uplink resources by the base station 200. However, in such case, only the cooperative transmission terminal, i.e., the second terminal 100b, may also transmit data by using the assigned uplink resource instead of the first terminal 100a, with the resource assignment information received by the first terminal 100a discarded.

At this time, the cooperative transmission terminal, i.e., the second terminal 100b, may send a request for the uplink resource, and when sending data, may use the information of the cooperation requesting terminal, i.e., the first terminal 100a. Accordingly, the base station uplink resource allocation request of the terminal and the uplink resource allocation message of the base station include at least one of the following types of information:

MSID (or STID) of cooperation requesting terminal

Temporary ID of cooperation requesting terminal

Cooperative cluster ID of cooperation requesting terminal

In procedure S250, the uplink resource allocation is performed by each of the cooperation requesting terminal and the cooperative transmission terminal. However, even in such case, if the base station performs RF combining, it is preferred that one of the cooperation requesting terminal and cooperative transmission terminal masks the CRC with common information between the terminals, and the base station 200 deals with this as if the cooperation requesting terminal requested the base station uplink resource allocation. In this case, it is preferred that the base station assigns resources by using the common identification information between the cooperative transmission terminals including the cooperation requesting terminal.

Further, in cooperative transmission, inter-terminal data communication is preferably limited up to rank 1 or rank 2 with respect to data transmission scheme due to a difficulty in channel estimation. In particular, it is preferred to use an open-loop MIMO transmission scheme.

For example, data transmission scheme for inter-terminal communication may preferably use one of Open-loop SM (Rank 2), Tx Diversity (Rate 1) ? SFBC, Rank 1 Random Beamforming transmission schemes.

Figure 11:
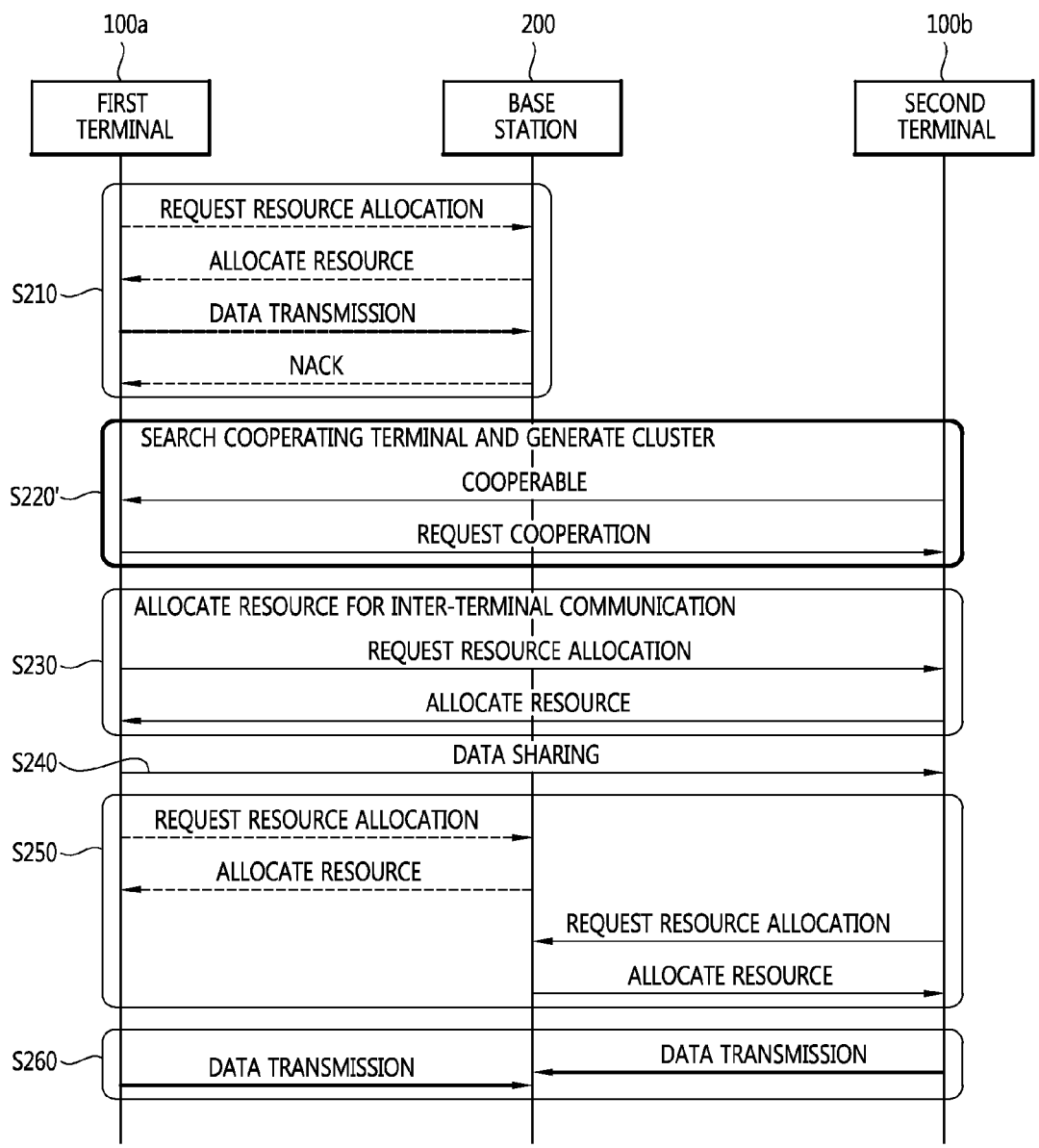
FIG. 11 illustrates another modified example of the method illustrated in FIG. 9.

FIG. 11 illustrates another modified example of the method illustrated in FIG. 9.

Referring to FIG. 11, unlike in FIGS. 9 and 10, a deformed cooperating terminal searching and cluster forming procedure S220' is shown.

Hereinafter, what is different from those described in connection with FIG. 10 is primarily described, and the description on the same part is skipped.

Upon generating the cooperative cluster (S220'), the second terminal 100b first transmits a cooperation-transmittable message, and the first terminal 100a receives the cooperation-transmittable message and then transmits a cooperation request message to the second terminal 100b.

At this time, the cooperation-transmittable message of the cooperable terminal, i.e., the second terminal 100b, may include at least one of the following types of information:

Identification information of cooperative transmission terminal, which may include MSID (or STID) of cooperative transmission terminal or temporary ID of cooperative transmission terminal.

Cooperative cluster ID of cooperation requesting terminal

Assignable resource information of cooperative transmission terminal, which may include one or more of resource allocation information (for example, resource size, resource location), transmission scheme (for example, MIMO scheme, PMI, rank indicator, etc.), and ACK/NACK transmission position.

The cooperation request message (i.e., cooperation requesting terminal ? cooperable terminal) transmitted from the first terminal 100*a* to the second terminal 100*b* in procedure S220' may include at least one of the following types of information:

Cooperation request indicator, which is an indicator indicating cooperation request transmitted from the first terminal to the second terminal.

Identification information of cooperation requesting terminal (for example, first terminal), which may include MSID (or STID) of cooperation requesting terminal and temporary ID of cooperation requesting terminal.

Cooperative cluster ID of cooperation requesting terminal

Channel information for base station uplink of cooperation requesting terminal, which may include CQI for base station uplink and reception SINR for base station uplink (or downlink).

Resource allocation request information of cooperation requesting terminal, which includes at least one of the following types of information: data information of terminal to be transmitted (data size (original information size), QoS, etc.) and uplink resource allocation information received from the base station (for example, resource location, allocation size, modulation & coding level, MIMO scheme, PMI, etc., or for example, data size (grant information size), QoS, etc.).

The embodiments and modified examples described thus far may be combined with each other. Accordingly, each embodiment is not implemented alone but may be rather combined with another as necessary. Such combinations may be easily implemented by those skilled in the art, and thus detailed description thereof is not repeated. Although not described herein, the combinations should not be construed as being excluded from the scope of the invention but are included in the scope of the invention.

The embodiments and modified examples may be implemented by various means. For example, the embodiments of the present invention may be implemented in hardware, firmware, software or a combination thereof.

When implemented in hardware, the methods according to the embodiments of the present invention may be embedded in one or more of ASICs (application specific integrated circuits), DSPs (digital signal processors), DSPDs (digital signal processing devices), PLDs (programmable logic devices), FPGAs (field programmable gate arrays), processors, controllers, microcontrollers, and microprocessors.

When implemented in firmware or software, the methods according to the embodiments of the present invention may be implemented in the form of modules, procedures, or functions that perform the above-described functions or operations. The software codes may be stored in the memory units and may be driven by the processors. The memory units may be positioned inside or outside the processors and may communicate data with the processors by various known means.

For example, the methods according to the present invention may be stored in storage media (for example, internal memories, flash memories, hard disks, or others) and may be implemented as codes or commands in the software programs that may be executed by the processors (for example, microprocessors).

FIG. 12 is a block diagram illustrating configurations of a terminal 100 and a base station 200 according to the present invention.

As shown in FIG. 12, the terminal 100 includes a storage unit 101, a controller 102, and a transmission/reception unit 103. The base station 200 includes a storage unit 201, a controller 202, and a transmission/reception unit 203.

The storage units 101 and 201 store the methods illustrated in FIGS. 1 to 11.

The controllers 102 and 202 control the storage units 101 and 201, respectively, and the transmission/reception units 103 and 203. Specifically, the controllers 102 and 202 execute the methods stored in the storage units 101 and 201. The controllers 102 and 202 transmit the above-described signals through the transmission/reception units 103 and 203.

In the embodiments described above, the components and features of the present invention are combined with one another in a predetermined form. Each component or feature should be considered to be selective unless otherwise stated. Each component or feature may be embodied without being combined with another component or feature. Further, some components and/or features may be combined to implement an embodiment. The order of the operations described in connection with the embodiments of the present invention may be changed. Some components or features in an embodiment may be included in another embodiment, or may be replaced by the corresponding components or features in the other embodiment. It is apparent that the claims which do not clearly depend upon each other may be combined with each other to configure embodiments or to be included in a new claim by amendment after the application is filed.

The description of the embodiments has primarily focused on the data transmission/reception between the base station and the terminal. Here, the base station has a meaning as a terminal node in a network, which directly communicates with the terminal. In this document, the specific operation described to be performed by the base station may be, in some cases, performed by the upper node of the base station.

At this time, the term "base station" may be replaced by other terms, such as fixed station, Node B, eNode B, or access point. Further, as used herein, the term "terminal" may be replaced by other terms, such as MS (Mobile Station), SS (Subscriber Station), or MSS (Mobile Subscriber Station).

The present invention may be embodied in various forms without departing from the spirit and necessary features of the present invention. Accordingly, the detailed description should not be construed as being limited in every aspect but as examples. The scope of the present invention should be determined based on reasonable interpretation of the appending claims, and all the modifications in the equivalent range of the present invention are included in the scope of the invention. It is apparent that the claims which do not clearly depend upon each other may be combined with each other to configure embodiments or to be included in a new claim by amendment after the application is filed.

The invention claimed is:

1. A method of receiving data cooperatively transmitted by a first terminal and a second terminal in a communication system, the method comprising:

transmitting, by the first terminal, an uplink resource allocation request messages to a base station;

receiving, by the first terminal, one or more uplink resource grant messages from the base station;

transmitting, by the first terminal, uplink data using the received one or more uplink resource grant messages;

receiving, by the first terminal, a negative response message from the base station, wherein the negative response message indicates that the transmission of uplink data is not received by the base station;

upon receiving the negative response message, transmitting, by the first terminal, a cooperation request message to the second terminal;

receiving, by the first terminal, a cooperation response message from the second terminal, wherein the cooperation request message and the cooperation response message are communicated between the first terminal and the second terminal without intervention from the base station, wherein the first terminal and the second terminal belong to same cooperative cluster, wherein the cooperation response message includes identifiers for the first terminal and the second terminal, and cooperative cluster information, and wherein the identifiers of the first terminal and the second terminal are unique identifiers or temporary identifiers; and sharing, by the first terminal, the data between the first terminal and the second terminal using assigned uplink resource information from the second terminal, wherein the first terminal and the second terminal are in the cooperation relationship based on the cooperative cluster information, and wherein the cooperative cluster information is generated by mutual cooperation between the first terminal and the second terminal.

2. The method of claim 1, wherein the assigned uplink resource information includes one or more of information on an uplink resource assigned to the first terminal.

3. The method of claim 1, further comprising:
transmitting the uplink data of the first terminal and the data of the second terminal to the base station after the data sharing between the first terminal and the second terminal.

4. The method of claim 3, wherein the data of the first terminal and the data of the second terminal are subjected to concatenation or permutation.

* * * * *